US012692089B2

(12) United States Patent
Bretz et al.

(10) Patent No.: US 12,692,089 B2
(45) Date of Patent: Jul. 28, 2026

(54) CONVEYOR SYSTEM AND METHOD FOR CONVEYING AND ADJUSTING THE POSITION AND/OR SPACING OF CONVEYED GOODS

(71) Applicant: FERAG AG, Hinwil (CH)

(72) Inventors: Markus Bretz, Herrliberg (CH); Martin Ruge, Starrkirch-Will (CH); Roberto Fenile, Wetzikon (CH)

(73) Assignee: FERAG AG, Hinwil (CH)

( * ) Notice: Subject to any disclaimer, the term of this patent is extended or adjusted under 35 U.S.C. 154(b) by 211 days.

(21) Appl. No.: 18/215,451

(22) Filed: Jun. 28, 2023

(65) Prior Publication Data

US 2024/0002161 A1     Jan. 4, 2024

(51) Int. Cl.
*B65G 43/08*          (2006.01)
*B65G 47/26*          (2006.01)

(52) U.S. Cl.
CPC ............. *B65G 43/08* (2013.01); *B65G 47/26* (2013.01)

(58) Field of Classification Search
None
See application file for complete search history.

(56) References Cited

U.S. PATENT DOCUMENTS

| | | | |
|---|---|---|---|
| 3,254,752 A | 6/1966 | Bauch et al. | |
| 6,694,220 B1 * | 2/2004 | Tanz ..................... | B65G 43/08 |
| | | | 700/226 |

| | | | |
|---|---|---|---|
| 7,050,938 B1 | 5/2006 | Prater et al. | |
| 7,306,086 B2 * | 12/2007 | Boelaars ................ | B65G 47/53 |
| | | | 198/782 |
| 8,655,484 B2 * | 2/2014 | Stoll ...................... | B65G 37/02 |
| | | | 700/226 |
| 9,221,622 B2 * | 12/2015 | Morency ............ | B65G 47/8861 |
| 10,543,986 B1 * | 1/2020 | Sines ..................... | B65G 13/02 |
| 10,569,976 B2 | 2/2020 | Lewis et al. | |
| 11,091,325 B2 * | 8/2021 | Kim ....................... | B65G 39/12 |
| 11,261,036 B2 * | 3/2022 | Kiyokawa .............. | B65G 37/02 |
| 11,459,188 B2 * | 10/2022 | Schroader ............. | G05B 19/05 |
| 11,548,734 B2 * | 1/2023 | Fourney ................ | B65G 13/10 |

(Continued)

FOREIGN PATENT DOCUMENTS

| | | |
|---|---|---|
| CN | 217550478 U | 10/2022 |
| DE | 39 10 524 A1 | 3/1990 |

(Continued)

OTHER PUBLICATIONS

EPO, Form EPO Form 1503 03.82, Extended EP Search Report for European Patent Application EP 23 18 2127, Oct. 24, 2023 (6 pp.) together with EPO Form 1703 01.91TRI (4pp.).

*Primary Examiner* — Kavel Singh
(74) *Attorney, Agent, or Firm* — Pauley Erickson & Swanson

(57) ABSTRACT

A conveyor system for conveyed goods, in particular for parcel pieces and packages, is disclosed. The conveyor system includes at least one conveyor device, which includes at least one cluster module and at least one control unit connected to the conveyor device. The conveyor system has a superordinate control system which is connected to the at least one control unit in terms of control technology, so that an adjustment of the position of a conveyed good and/or spacing between adjacent conveyed goods occurs on the basis of control commands from the control system.

25 Claims, 15 Drawing Sheets

(56) References Cited

U.S. PATENT DOCUMENTS

| | | | |
|---|---|---|---|
| 11,878,876 B2 * | 1/2024 | Fenile .................... | B65G 47/40 |
| 12,012,291 B2 * | 6/2024 | Elmardini ............. | B65G 47/31 |
| 2013/0166062 A1 | 6/2013 | Casey et al. | |
| 2022/0171369 A1 | 6/2022 | Uriarte et al. | |

FOREIGN PATENT DOCUMENTS

| | | | | |
|---|---|---|---|---|
| DE | 39 10524 C1 | 4/1993 | | |
| DE | 10 2010 015 584 A1 | 10/2011 | | |
| DE | 10 2011 104 900 A1 | 12/2012 | | |
| DE | 10 2012 014 181 A1 | 1/2014 | | |
| DE | 10 2019 135 620 A1 | 6/2021 | | |
| DE | 10 2021 107 088 A1 | 9/2022 | | |
| EP | 0 582 963 A1 | 2/1994 | | |
| EP | 1 510 479 A1 | 3/2005 | | |
| EP | 3357839 A1 * | 8/2018 | ............ | B65G 13/10 |
| EP | 4 079 660 A1 | 10/2022 | | |
| WO | WO 2014/177361 A1 | 11/2014 | | |
| WO | WO 2015/200460 A1 | 12/2015 | | |
| WO | WO 2022/200392 A1 | 9/2022 | | |
| WO | WO 2022/200393 A1 | 9/2022 | | |

* cited by examiner

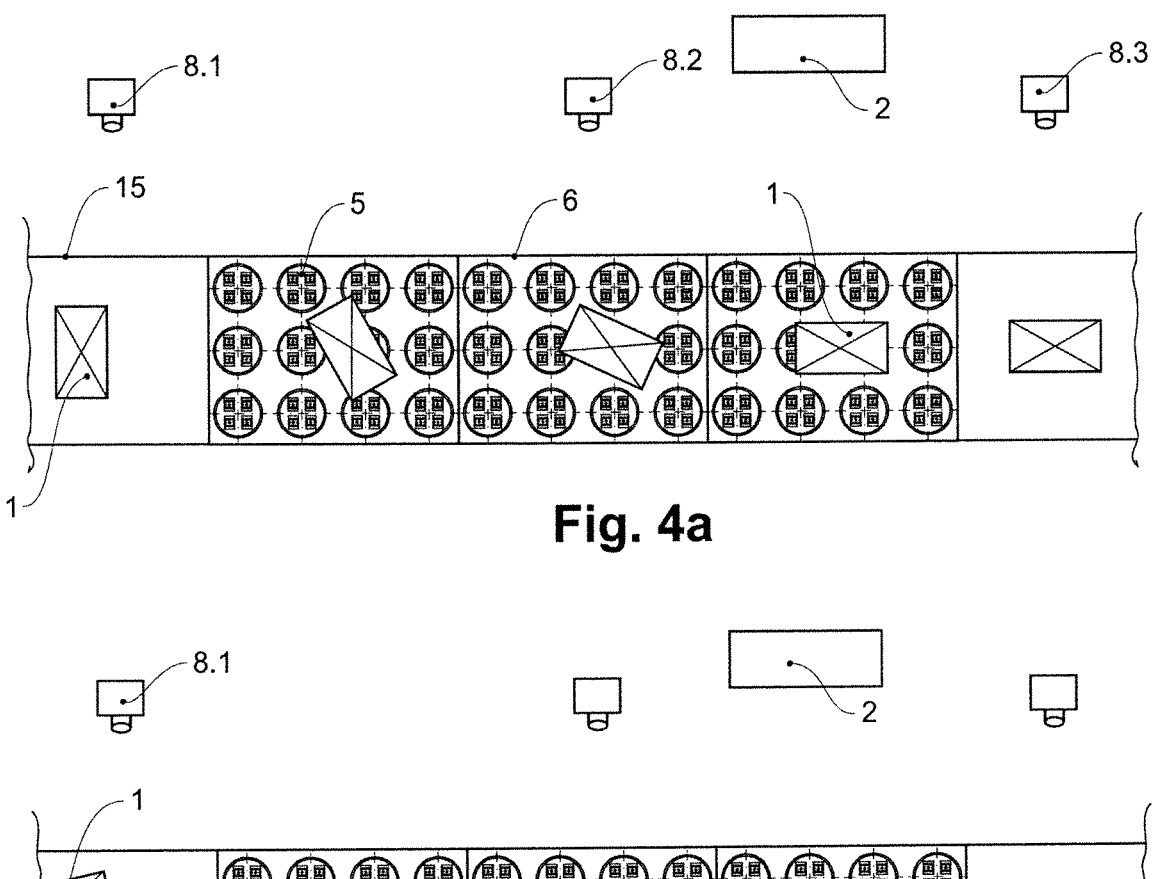
Fig. 4a
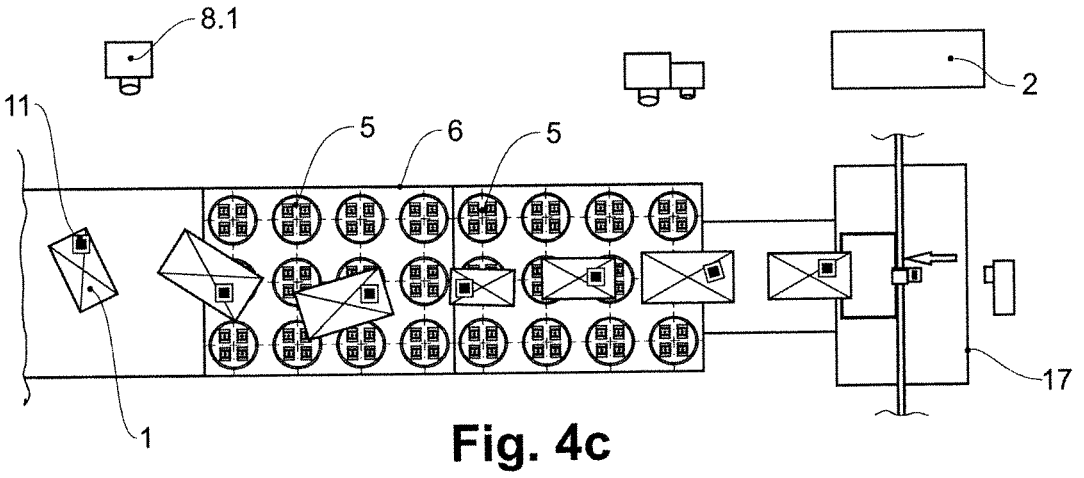
Fig. 4b
Fig. 4c

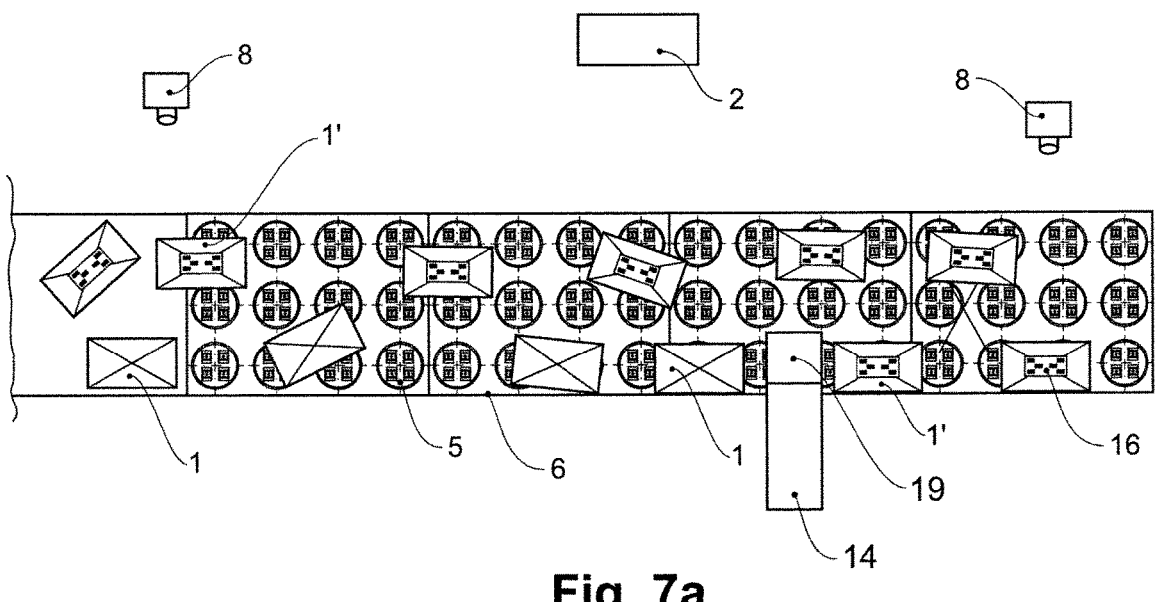
Fig. 7a
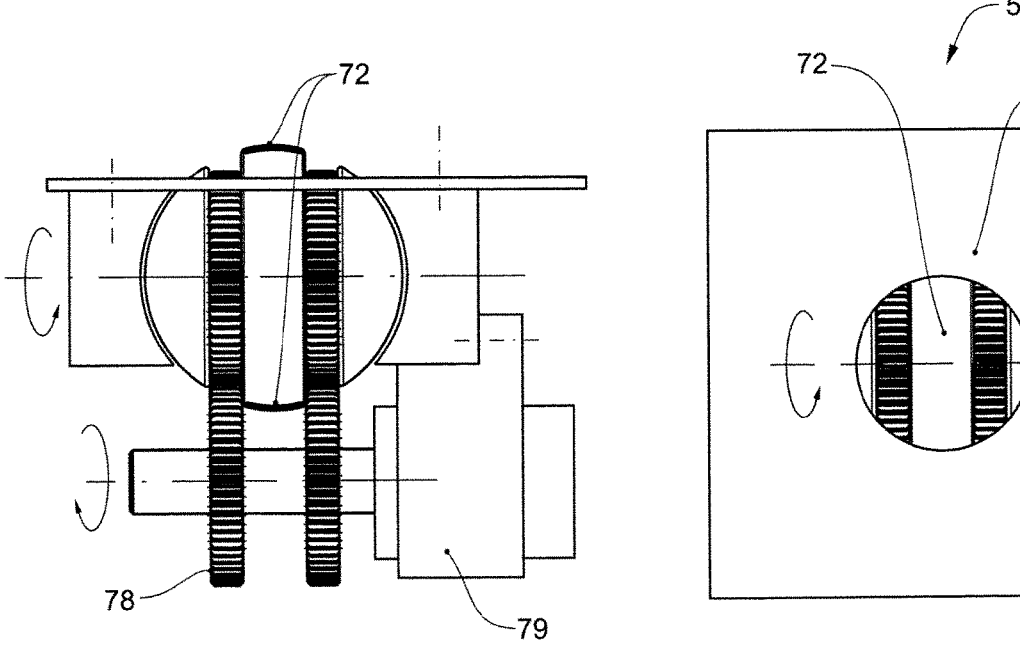
Fig. 7b
Fig. 7c

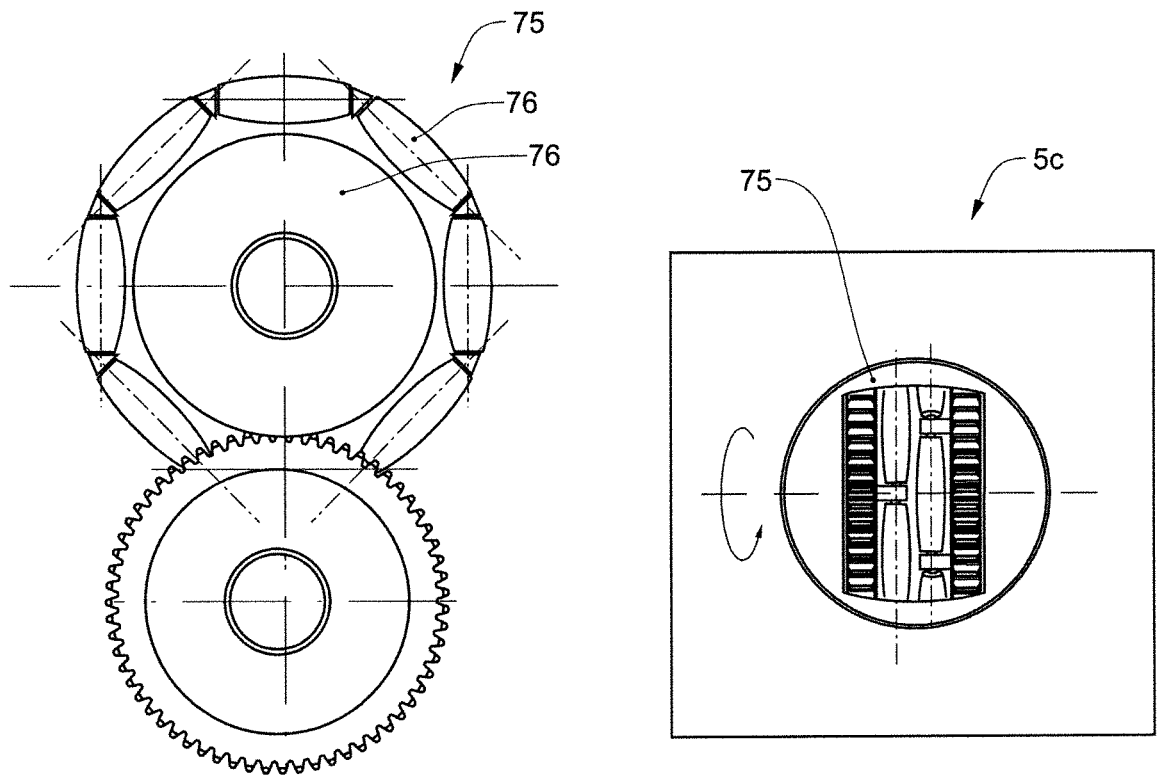
Fig. 7d
Fig. 7e
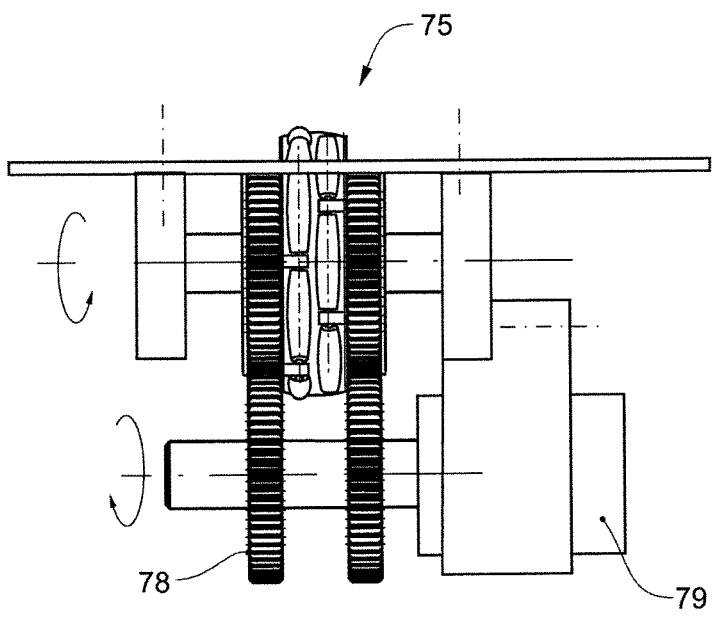
Fig. 7f

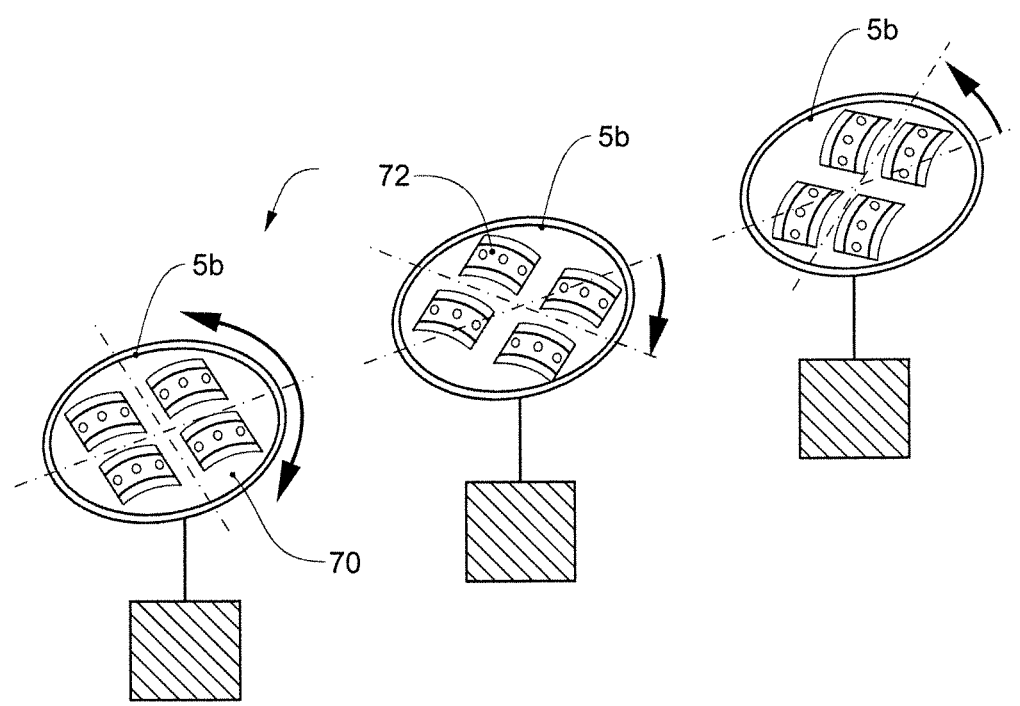
Fig. 8a
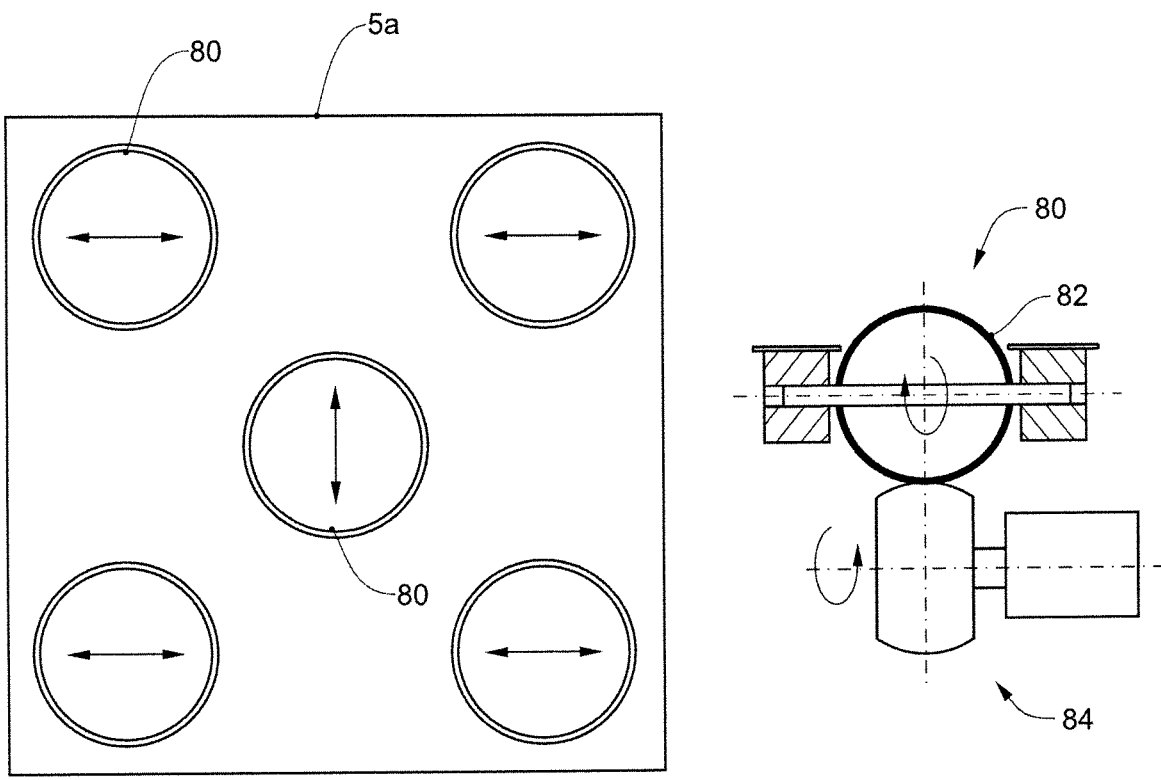
Fig. 8b
Fig. 8c

Fig. 10a        Fig. 10b

CONVEYOR SYSTEM AND METHOD FOR CONVEYING AND ADJUSTING THE POSITION AND/OR SPACING OF CONVEYED GOODS

CROSS REFERENCE TO RELATED APPLICATIONS

This patent application claims priority to Swiss Patent Application No. CH000788/2022, filed 29 Jun. 2022; Swiss Patent Application No. CH0010302022, filed 2 Sep. 2022; and Swiss Patent Application No. CH000285/2023, filed 13 Mar. 2023.

The aforementioned priority documents, corresponding to this invention, to which a foreign priority benefit is claimed under Title 35, United States Code, Section 119, and Title 37, United States Code, Section 1.55, and their entire teachings are incorporated, by reference, into this specification.

All the above-referenced applications are hereby incorporated by reference herein in their entirety and are made a part hereof, including but not limited to those portions which specifically appear hereinafter.

FIELD OF THE INVENTION

The present invention relates to a conveyor system for conveyed goods, in particular for packages and parcel pieces, and to a method for conveying and adjusting the position and/or spacing of the conveyed goods.

BACKGROUND OF THE INVENTION

The principle of cluster unit-based conveyor devices is known from the prior art. It enables effective and precise control of horizontally conveyed goods through the use of driven cluster units such as rollers or omnidirectional wheels. The driven cluster units are used to convey the conveyed goods over the conveyor system and to generate a driving force that is transmitted to the cluster units by the contact pressure of the goods.

By rotating and or pivoting the cluster units, the direction of movement and orientation of the conveyed goods can be controlled, allowing high flexibility in handling different goods and materials. This principle of conveyor technology is used in many industries such as logistics, manufacturing and packaging to ensure effective material movement.

There are two types of cluster units that are commonly used in the conveyor system. These are rollers and omnidirectional wheels. Rollers are generally less expensive than non-directional wheels, making them a more cost-effective option for many applications. Rollers are generally more durable and can handle heavier loads than non-directional wheels, qualifying them as a good choice for applications that require heavy handling. Rollers are also simpler and less complicated than omnidirectional wheels, making them easier to install, maintain and repair. However, rollers only move in one direction, which limits their maneuverability compared to omnidirectional wheels. This can make it more difficult to maneuver around corners or obstacles and result in lower precision and accuracy compared to omnidirectional wheels. Rollers may also require more maintenance to ensure they continue to function properly, especially in applications that require heavy use or harsh operating conditions. In addition, rollers may not be able to reach the same speeds as omnidirectional wheels, especially in applications that require fast and precise handling.

On the other hand, omnidirectional wheels offer many advantages in terms of maneuverability and flexibility. However, there are also some potential disadvantages, such as higher cost compared to rollers, lower weight capacity, and complexity. In addition, because omnidirectional wheels are more complex than conventional wheels or rollers, they can be more susceptible to wear or damage over time, which can lead to higher maintenance and repair costs and downtime. Despite these potential drawbacks, the flexibility and maneuverability of omnidirectional wheels can offer significant advantages in many applications, especially in situations where the conveyor system must handle a wide range of materials or navigate around obstacles.

The cluster unit-based conveyor system is capable of handling both light and heavy goods with high accuracy and efficiency. It is easy to operate and requires minimal maintenance, making it a cost-effective solution for many companies. In addition, it can be automated by integrating sensors and control systems to further improve material flow and increase productivity.

It should be noted, however, that in the case of comparatively light unit loads, the contact pressure and thus the frictional adhesion may be too low to exert a sufficient entrainment force on the conveyed material. An increase in conveying capacity and correspondingly in conveying speed leads to higher inertia forces and even aerodynamic effects, which counteract the frictional adhesion and make it even more difficult to achieve sufficient entrainment force.

Particularly in the case of flexible and pliable conveyed goods, such as items of clothing or foiled goods, poor static friction can occur on the driven cluster units due to the uneven contact surface. These goods do not rest exclusively on the protruding cluster units, but also on the contact surface between the cluster units. Consequently, the weight of the conveyed goods is transferred unevenly to the cluster units, which can impair the static friction and lead to improper movement and positioning of the goods.

However, there is a growing need, especially in the mail order business, to convey light and flexible conveyed goods, such as items of clothing packed in plastic sleeves, without interference by means of cluster unit diverters such as roller diverters. It is therefore of great importance to reliably and effectively steer these conveyed goods in the desired direction using cluster unit diverters as well.

Furthermore, it is also important to convey and sort parcel pieces efficiently, as the mail order and e-commerce industries have grown rapidly in recent years. By using automated conveyor systems with sorting equipment, parcel pieces and packages can be transported efficiently and quickly from one location to another. This saves time and costs, increases productivity and reduces potential sources of error that can occur in manual processes.

DESCRIPTION OF PRIOR ART

An example of a roller diverter for sorting conveyed goods, such as packages, is described in DE 39 10 524 C2. This roller diverter consists of several driven rollers which extend over the entire width of the conveyor track and are arranged transversely to the conveying direction. The rollers are individually rotatably mounted in side plates and can deflect the conveyed goods from their conveying direction by swiveling. This type of roller diverter is particularly suitable for diverting points.

U.S. Pat. No. 3,254,752 also describes a roller diverter placed on a branching conveyor. This enables the goods to be directed onto one of the two downstream conveyor tracks.

In WO 2015/200460 A1, a plate-shaped roller assembly is described in which a roller can be pivoted about an axis arranged perpendicular to the conveying plane via a gear drive. The associated conveying diverter consists of a plurality of roller assemblies arranged in rows and columns, which are recessed into a conveying surface. This type of roller diverter is particularly suitable for use in conveyor systems where precise and reliable sorting of the conveyed goods is important.

The disclosure of DE102021107088A1 relates to a conveyor system for sorting and conveying conveyed material units with special conveyed material drives. These drives can move the units in any direction within the conveying plane and are individually driven and controlled. The system may include multiple drive modules, non-parallel or orthogonal axes of rotation, and various detection and target position determination means. A method includes typing detection of conveyed material units, determining target positions, and controlling the movement of the units using the conveyed material drives to achieve a sorted arrangement in subsequent conveyor sections. In addition, other steps such as deciding on the need for movement and calculating the direction and strength of movement can be performed.

CN217550478U discloses a logistics package delivery system. The system receives packages, measures and scans their information, sorts and buffers them, and then moves them in the desired direction. There are also special mechanisms, such as a control table that can change the direction of the packages. The control tables have a support, a control mechanism and a roller bearing to ensure the smooth operation of sorting. There are also different mechanisms to separate and move the packages, including conveyor belts and drive rollers.

EP4079660A1 describes a sorting and transport module for handling packages with roller assemblies that can rotate in any direction within a sorting and transport plane. The module has a first and second drive means that control rotation of the rollers and roller assemblies, respectively, to allow forward movement of the package. The module may have four roller assemblies whose rotation is controlled by a gear wheel and an electric motor. The module may be housed in a box-shaped housing, and multiple modules may be arranged side-by-side to form a sorting and transport plane.

DE102012014181A1 describes an omnidirectional conveyor system module comprising at least two omnidirectional cluster units, i.e. omnidirectional wheels, with individually driven conveyor wheels arranged at a non-zero angle to each other. The module may have three cluster units arranged side by side without parallel directions of action. The conveyor wheels may be arranged in the side centers of an equilateral triangle, with the directions of action at 90° to the sides of the triangle or at a non-zero angle to the associated side. The system may be plug-in and modular, with control means connected to the drive motors. A passive conveyor system module may also be included, and the system may be arranged in groups of two or three units with non-orthogonal directions of action.

U.S. Pat. No. 10,569,976 B2 describes a transportation system for motor vehicles that transports pallets and containers through an internal omnidirectional conveyor system. The system includes a weight sensor and an infrared sensor to identify available storage space in the cargo area, and a computing device to calculate the destination based on the weight and expected route of the vehicle. An external conveyor system with a lift ramp is used to move the pallet or container into the vehicle. The internal conveyor system picks up the pallet or container and delivers it to the destination based on instructions from the computer device. The disclosure also includes a method for automatically moving pallets and containers within the transport vehicle and an intelligent storage container for use with a transport vehicle or train.

SUMMARY OF THE INVENTION

In accordance with the task, the present invention strives for a solution in which at least one of the disadvantages of the prior art is counteracted at least in certain areas and which enables an efficient conveying solution optimized for various conveying elements.

This task is solved by the features of the independent claims.

In addition to considering the disadvantages of the state of the art, simpler and cheaper maintenance of the entire conveying system is envisaged, and also the conveying density is to be improved as far as possible.

The solution according to the invention has a conveyor system for conveyed goods, in particular for packages and parcel pieces. The conveyor system comprises at least one conveyor device, which includes at least one cluster module, and at least one control unit connected to the conveyor device. The conveyor system has a superordinate control system which is connected to the at least one control unit in terms of control technology, so that an adjustment of the position of a conveyed good and/or spacing between adjacent conveyed goods occurs on the basis of control commands from the control system.

As mentioned, an adjustment of the position of a conveyed good and/or the spacing between adjacent conveyed goods can be made on the basis of control commands from the control system. Adjustment of the position of a conveyed item and the spacing between adjacent conveyed items can occur on the basis of control commands from the control system.

An adjustment of the position of a conveyed good or the spacing between adjacent conveyed goods can occur on the basis of control commands from the control system. The at least one control unit is coupleable to at least one computer unit, wherein the at least one computer unit receives control commands from the control system. Thus, the conveying process can be initiated and controlled from a top tier. The computer unit and control unit form a further tier and cooperate with the control system, but can also act autonomously.

The at least one computer unit may be configured to determine the position of a conveyed good and/or spacing between adjacent conveyed goods in an optimized manner based on the dimensions and/or a content of a transport element, which enables a more efficient conveying process.

The computer unit may be configured to determine or calculate the position of a conveyed good and the spacing between adjacent conveyed goods in an optimized manner on the basis of the dimensions and/or a content of a transport element.

The computer unit may be configured to determine or calculate the position of a conveyed good or the spacing between adjacent conveyed goods in an optimized manner based on the dimensions and/or a content of a transport element.

The determination or calculation can be based on the dimensions or contents of a transport element. However, the determination can also be made on the basis of the dimensions and contents of a transport element.

In one embodiment, the conveying as well as the adjustment of the position and/or spacing of the conveyed goods occurs through the at least one control unit, which sends control commands to the cluster modules.

In another embodiment, the adjustment of the position and/or spacing of the conveyed goods occurs without control commands from the control unit by the cluster modules exchanging simple commands and instructions with each other. The cluster modules use minimal logic for this purpose.

In another embodiment, the control unit acts independently of the control system. This can be the case for simple transport and conveying tasks or if the tasks are already known. The use of artificial intelligence (AI) can also be provided, as self-learning systems, so-called "machine learning", can then be used to further optimize the conveying process.

The conveyor system comprises at least one sensor unit designed to detect the position and/or orientation of at least one conveyed product. The solution according to the invention offers numerous advantages. By using sensor units and a control unit, the conveyor system can be made flexible and adaptable to ensure optimal alignment and spacing of the conveyed goods. This can result in more efficient and faster conveying of the conveyed goods, which in turn leads to higher productivity and less downtime. In addition, the conveyor system is also easy to maintain and repair, as the sensor units and control unit allow any problems to be identified quickly and accurately.

Sensor units and communication units of the drive units can be wired or wireless.

It is advantageous to adjust the alignment of conveyed goods, such as packages or parcel pieces, and thus to optimize their optimal alignment depending on the dimensions of the transport elements. As a dimension of the transport elements, the skilled person imagines, for example, an opening of the transport element, e.g. of a transport bag.

By optimizing the alignment of the conveyed goods, malfunctions and operational failures can be avoided, resulting in a higher conveying density and efficiency of the entire conveying system. In addition, the utilization of the conveying elements can be optimized by clever arrangement of the conveyed goods in the conveying elements. This can be achieved by optimized alignment and spacing. In addition, optimized spacing can also contribute to a uniform and weight-optimized utilization of the conveyor system.

Finally, the conveyor system can also be optimized for the loading status of the cluster unit. That is, which conveyed good should be conveyed in a transport element so that the transport element is loaded in an optimized manner. To achieve this, a variety of conveyed goods can be rotated, accelerated, stopped or influenced in other comparable ways.

The solution according to the invention can be supplemented or further improved by the following further embodiments, each of which is advantageous in itself.

According to one embodiment, it is provided that the at least one sensor unit is designed to detect the position of at least one conveyed good.

This is important in order to be able to adjust the spacing between adjacent transport elements. This can not only achieve optimum utilization of the transport elements, but also efficient use of the available conveying space. In addition, position detection can also help to ensure that the conveyed goods are transported in a specific order, which can be of great importance when sorting packages or other goods.

Alternatively or additionally, the at least one sensor unit can detect the orientation of at least one conveyed good. Adjusting the orientation is particularly advantageous for achieving an optimized infeed position of the conveyed material at the opening of a conveyor element. Furthermore, a possibility to adjust the orientation of conveyed goods on the conveyor device can help to avoid collisions between adjacent conveyed goods and thus reduce disturbances.

Furthermore, the ability to adjust the spacing and orientation of the conveyed goods means that different types of transport elements can be used efficiently to convey different types of conveyed goods. This increases the flexibility of the conveyor system and enables effective handling of transport tasks.

According to a further embodiment, it is provided that the at least one cluster module comprises at least one cluster unit.

It is advantageous if the cluster module contains more than one cluster unit to achieve a higher clearance when manipulating conveyed goods. The decision on the appropriate number and design of cluster modules depends on various factors, such as the size, weight and shape of the conveyed goods. It is also possible to equip the cluster modules with a rail system so that at least one cluster unit integrated in the cluster module can be moved horizontally. Alternatively or additionally, the integrated cluster unit can also be movable vertically. This has the advantage that the distance between adjacent cluster units can be adjusted, making the overall solution more flexible and enabling it to be adapted to the shape of the conveyed good.

The cluster modules with the cluster units can be mapped analogously to a vector field and the individual cluster units can be controlled separately so that conveyed material can be optimally transported, moved, offset or rotated.

Advantageously, a cluster unit is designed as a ball. Furthermore, the cluster unit can be designed as a roller or an omnidirectional wheel. In addition, each cluster unit can be designed to be drivable or driveless.

Furthermore and alternatively, each cluster unit can be switched between drivable or driveless. It is advantageous to use balls as cluster units instead of rollers or omnidirectional wheels. Balls offer greater maneuverability and flexibility in a conveyor system application compared to rollers or omnidirectional wheels. They can rotate freely in all directions, allowing for nearly frictionless travel through tight turns and around obstacles such as other conveyed materials. In addition, balls can distribute weight more evenly than rollers or wheels, resulting in less wear on the conveyor system. This in turn can lead to longer conveyor system life and lower maintenance costs.

Using balls instead of rollers or wheels can also help reduce noise and vibration, which is especially beneficial in applications that require a quiet or low-vibration environment. Furthermore, balls are also advantageous because they do not need to be pivoted to allow a conveyed material to approach them without additional friction. This is not the case with the other two design variants for rollers and omnidirectional wheels, because these are only bilaterally symmetrical.

The fact that balls are spherically symmetric presents wide advantages, especially with respect to a large number of cluster units and/or cluster modules working together. For example, it is possible to leave at least some of the cluster units passive and drive only pertinent cluster units. This flexibility is particularly advantageous when conveying larger materials that require a not so small distance between cluster units. This solution can save energy and increase the efficiency of the conveyor system.

It is particularly advantageous to make the balls from polyamide, stainless steel and ceramic. Polyamide balls have a smooth and hard surface, which enables smooth movement and low friction, which in turn contributes to an energy-efficient conveyor system. In addition, polyamide balls have high resistance to wear and a high load-bearing capacity, which ensures a long service life of the conveyor system. Stainless steel balls are resistant to corrosion and wear, while ceramic balls have high hardness and wear resistance. The choice of the best material depends on the specific requirements of the conveyor system application, such as the environment in which the conveyor system is operated, the load capacity of the balls and the required mobility.

In addition, the surface of the balls can be rubberized, which helps the conveyor system run more quietly and with less vibration. Rubber has high damping ability, which means it can absorb vibration and noise. The rubber coating on the ball surface can optimize the friction between the ball and other surfaces, which contributes to friction-optimized motion and more energy-efficient operation of the conveyor system. In addition, the rubber coating can help the balls have better adhesion to the conveying surface, preventing slippage or slipping.

However, the cluster unit consists not only of an upper part that is in contact with conveyed goods, but also of a drive part that sets the upper part in motion. The drive part can have different design forms. For example, it may consist of classical mechanical components such as gears, belts and bearings. Nevertheless, such designs are complicated, expensive, difficult to maintain and prone to failure.

For this reason, it is advantageous to replace the classic solution with a magnetic coupling system. The magnetic coupling system consists of two sets of magnets, one on the drive shaft of the motor and one on the hub of the upper part of the cluster unit. These magnets are arranged so that they attract each other but are separated by a small gap. When the motor rotates, it creates a moving magnetic field that causes the upper part to rotate.

By using a magnetic coupling system, it is possible to find a cost-effective and highly efficient solution, as there is no physical/mechanical contact between the motor and the upper part, resulting in less friction and wear on the components. Such a system can be used for any upper part, regardless of its geometry.

A series of permanent magnets can be embedded in the upper part of the cluster unit according to a precise pattern. These magnets would be arranged in a circular pattern, alternating polarity and allowing rotation about one axis. To achieve rotation about the other two axes, additional magnets can be added at right angles to the first set, creating a three-dimensional magnetic field.

To drive the magnetic coupling system, a motor can be mounted inside the upper part, with a magnetic ring attached to the drive shaft of the motor. Alternatively or complementarily, the drive can be mounted with a magnetic ring on a base or platform below the top. The magnetic ring would be arranged to align with the magnetic pattern on the underside of the hemisphere, allowing rotation about all three axes.

Another solution that can be used is a gimbal mechanism. A gimbal is a set of two or three rings placed at right angles to each other, each ring being able to rotate independently around its own axis. By connecting a hemispherical shell to the gimbal mechanism, it is possible to achieve rotation, around all three axes. The gimbal mechanism can be driven by motors attached to each ring, each motor driving the rotation of the corresponding ring.

According to a further embodiment, it is provided that the at least one conveyor device comprises a plurality of cluster modules. In addition, each of these cluster modules can be implemented as a ball, roller or omnidirectional wheel module.

The advantage of this solution is the possibility to combine different cluster modules. For example, it is possible to divide the conveyor into two halves, with the first half equipped with ball modules and the second half with roller modules. With this solution, the various advantages of the two cluster modules can be used in one conveyor device.

In addition, cluster modules of different sizes or materials can also be combined to meet the requirements of the conveyed goods. Another option is to use cluster modules with different load capacities in order to be able to transport heavy goods without any problems.

In addition, the use of different cluster modules also offers greater flexibility in the design of the conveying system. For example, a particular cluster module can be easily replaced or added as needed to optimize conveying efficiency.

Another possibility is to combine different cluster modules within a single cluster module, thus enabling the transport of goods with different requirements. For example, a cluster module can be equipped with both balls and rollers to ensure optimal conveying of different goods.

According to a further embodiment, it is provided that the at least one conveyor device comprises a plurality of cluster modules. Furthermore, each of these cluster modules is individually controllable by the at least one control unit.

The skilled person recognizes the advantages of this solution. For example, the alignment of several conveyed goods on the conveyor can be individually adjusted. The same applies to the adjustment of the distance between adjacent conveyed goods, which can become larger or smaller or alternatively lead to certain patterns. It follows that such a solution increases the conveying density of the conveyor system, which leads to improved efficiency.

In addition, better load distribution on the transport equipment can be achieved by controlling the transport modules individually. This is particularly important for heavy or unevenly distributed goods in order to avoid overloading the conveyor and to extend the service life of the system. In addition, the individual control of the cluster modules can help to ensure that the conveyed goods are transported in a specific order, which can be of great importance when sorting packages or other goods.

According to a further embodiment, it is provided that the at least one cluster module contains a plurality of cluster units. Furthermore, each of these cluster units is individually controllable by the at least one control unit.

This embodiment goes even further than the previous one and offers the advantage of individual control of the cluster units within a cluster module. This further increases the flexibility of the conveyor system, which can play a significant role especially in the case of large distances between the individual cluster units.

Individual control of each cluster unit within a cluster module also allows special requirements for conveying specific goods to be met. For example, the rotation speed or rhythm of the cluster units can be adjusted to protect fragile or sensitive goods. Likewise, individual control can help avoid bottlenecks in the conveyor system and optimize material flow. Another possible application is the targeted separation of different conveyed goods to enable efficient sorting.

According to a further embodiment, the sensor unit is designed as an optical sensor.

The optical sensor can be designed in different forms. For example, the optical sensor can be a camera. In addition, the optical sensor can collect various types of information about the conveyed goods. For example, it is possible to use the optical sensor to collect barcodes or QR codes on the conveyed goods. This information can then be used by the control unit of the conveyor system to transport the conveyed goods specifically to the desired destinations.

Another option is to use the optical sensor to detect colors. This enables the conveyor system to automatically detect different package types or sizes, for example, and handle them accordingly.

According to a further embodiment, it is provided that the at least one control unit is coupleable to at least one computer unit.

The at least one computing unit can be, for example, a computer or calculator. Nevertheless, other forms such as a server or cloud systems are also possible. Furthermore, the computer unit contains relevant software.

Finally, the computer unit can also be connected to other systems within the conveyor network to ensure a smooth flow of information and effective control of the entire conveyor system. For example, the computer unit can be connected to a warehouse management system or material flow computer to monitor and optimize the stocks of conveyed goods in real time.

According to a further embodiment, the at least one computer unit is designed to determine or calculate optimized alignments of conveyed goods on the basis of the dimensions. Alternatively or additionally, the at least one computer unit can be designed to calculate an optimized spacing between adjacent conveyed goods. Furthermore, alternatively or additionally, both the optimized alignment and the optimized spacing can be calculated based on a content of a transport element.

This solution enables trouble-free and efficient loading of the transport elements with conveyed goods. In addition, possible damage and wear of the transport element due to improper alignment of the conveyed goods can be reduced. This can be the case, for example, if the transport element comes into contact with a sharp edge of the conveyed good. Correct alignment and spacing of the conveyed goods can also reduce the risk of the conveyed goods not being loaded correctly into the transport elements. This can be done in two ways.

First, the transport element is not loaded with a conveyed material because it does not fit into the opening of the transport element. This can lead to possible damage to the conveyed material. Secondly, the transport element is loaded but not optimized. This means that the transport element can transport less conveyed material, resulting in a lower conveying density of the conveyor system. As mentioned above, the risk of these two cases occurring is minimized by this embodiment.

According to a further embodiment, it is provided that the adjustment of the alignment and, alternatively or additionally, the spacing of the conveyed goods, can be performed by the at least one control unit.

The at least one control unit can, for example, be designed as a programmable logic controller. Furthermore, this should be connected to the conveyor device.

In addition, other sensors, such as weight or volume sensors or contour sensors, can also be integrated into the conveyor system to enable even more precise and efficient control of the conveyed goods. These sensors can be used, for example, to determine the weight and volume of the conveyed goods in order to determine the optimal number of conveyed goods in a transport element and thus avoid overloading or underloading the transport element.

In addition, the at least one control unit can also be connected to a warning system in order to trigger an alarm in the event of malfunctions or faults in the conveyor system, thus enabling the problems to be rectified quickly. The integration of a remote control or an automatic fault detection and correction is also possible and advantageous.

According to a further embodiment, at least one feeder station is arranged on the at least one conveyor device.

These feeder stations are used to load the transport elements, such as a transport bag, with sorted, aligned and rejected conveyed goods. In addition, the conveyor can deliver the conveyed items to multiple feeder stations located along the conveyor to further increase efficiency.

Furthermore, it is also important to ensure that an optimally aligned conveyed material is correctly delivered into the transport element. This can be done by means of a chute element, which can be designed as an inclined platform. Furthermore, this platform can allow the conveyed goods to be discharged directly from the conveying device into the transport element. This is advantageous because it allows for a simpler construction and thus costs can be reduced.

According to another embodiment, it is provided that at least one accumulation station is arranged on the at least one conveyor device.

It is particularly advantageous to provide the conveyor with the accumulation station or buffer station. Such stations are for conveyed goods which were not conveyed by the conveyor to the at least one feeder station for various reasons.

The accumulation station can, for example, be designed as a collection container or an intermediate storage facility. This ensures that the conveyed materials can be controlled and processed further without delay. The accumulation station can also help to avoid bottlenecks in the conveying system and ensure that the conveying process runs smoothly. In addition, the accumulation station can help to ensure that the conveyed goods are ordered so that they can subsequently be forwarded in the correct sequence and without delay. Another advantage of the accumulation station is that it reduces the need for manual intervention by providing an automated intermediate solution to store the conveyed goods in a controlled and safe manner until they can be further processed.

According to a further embodiment, it is provided that the conveyor system is equipped with a marking device.

The marking device can be, for example, a printer or stamping device. However, other possibilities such as a color marker, a labeler or a laser marker are also possible. The marking device is used to mark the conveyed goods on the conveyor device and thus enable clear identification, which is of great importance for the conveying process.

According to a further embodiment, it is provided that the marking device designates at least one conveyed item with an identification means. Alternatively or additionally, at least one conveyed item can be designated with an alignment code. The alignment code can be applied visibly, invisibly, or removably.

It is also advantageous to print and/or apply an adhesive to a conveyed good before it is introduced into the conveyor system, as this can then be processed directly.

The optical system consisting of a camera for tracking the position of a conveyed product can be replaced by a code-based system. This is particularly advantageous because the code-based system is less complex and less expensive than a camera. The solution is to apply an identification means to each conveyed item, which allows more precise tracking of each conveyed item. Moreover, the identification means can be, for example, a barcode, QR code or RFID tag.

Alternatively or additionally, it is possible to print or mark the alignment code on at least one conveyed item, which can serve as a reference of its position and/or rotation. Furthermore, this code can be recognized by a sensor of the conveyor system and thus also the position and/or of the conveyed material. Furthermore, it is advantageous to control the cluster units based on this information in such a way that a desired orientation of the conveyed material is achieved.

Various options can be considered as a sensor. For example, it is possible to use a photoelectric sensor to detect the edges and/or pattern of the code and to determine or calculate the rotation based on the position of the edges and/or pattern.

The photoelectric sensor can be placed above or below the conveyor, and the conveyed goods with the alignment code is guided by a light beam. The sensor detects the code by the interruption of the light beam caused by the code. Once the sensor has detected the alignment of the alignment code, it can send a signal to the computer unit and/or control unit for processing. A correction signal can then be sent to relevant cluster units so that the orientation of the conveyed material can be adjusted accordingly. This ensures that the conveyed material is rotated to the desired orientation before it reaches the next step in the conveying process.

Another advantage of this system is that it is more reliable and robust because it does not rely on visual detection, which can be affected by lighting conditions, the orientation of the conveyed goods, or other factors. Among other factors, the skilled person can imagine, for example, deformation of the conveyed material that would make accurate orientation detection by a camera difficult.

According to a further embodiment, it is provided that the identification means is the alignment code.

The identification means may include or comprise the dimensions or dimensions of the conveyed product, preferably in a code.

It is particularly advantageous to use the alignment code on each conveyed good also to track the conveyed good throughout the supply chain, thereby replacing the means of identification. This would bring together improved supply chain efficiency and also cheapen the whole conveyor system, because it would not be necessary to use a separate technology, for package tracking.

Furthermore, it is also possible to use the orientation code only to detect the orientation of a conveyed good but at the same time as printing this code, to use an identification means, for example a QR code. This would also bring greater efficiency and lower costs, as this solution would not require a complex optical system.

The printed alignment code can be a simple black and white or grayscale square grid pattern. This type of pattern consists of alternating black and white or gray-scale squares, and the size and spacing of the squares can be adjusted to accommodate a range of resolutions and sensitivities. One advantage of using a square grid pattern is that it can be easily created and printed using standard printing techniques and can be easily detected by a variety of optical sensors, including cameras, scanners and bar code readers. In addition, the alternating black and white or grayscale squares provide a high-contrast pattern that can be easily recognized even in low-light conditions. It would also be possible to equip the alignment code pattern with different features to achieve improved detection and accuracy. Reference marks can be added to the pattern to improve detection accuracy, while a color pattern can provide additional information and a high-contrast pattern. Increasing the resolution of the pattern can also result in higher accuracy and sensitivity.

Using a pattern with unique features, such as curved lines or non-rectangular shapes, can also improve detection accuracy, but can be more difficult to create and print than a simple square grid pattern.

According to a further embodiment, it is provided that the orientation of the conveyed good can be detected as the orientation of an outer shell of the conveyed good by means of the sensor unit. Alternatively or additionally, the orientation of the alignment code can be detected by means of the sensor unit.

The advantages of this embodiment have already been described above. However, it should be mentioned that by detecting the orientation of the conveyed goods or the alignment code by means of the sensor unit, precise control and management of the conveying process is made possible. In this way, possible malfunctions and operational failures can be avoided, resulting in increased efficiency and productivity of the conveyor system. Furthermore, precise alignment and control of the conveyed goods can reduce possible damage to the goods.

A detection device can detect the dimension of the conveyed goods. The recorded values can be specified or coded as or in the identification means.

The solution according to the invention also has a method for conveying and adjusting the position or orientation and alternatively or additionally spacing of conveyed goods, in particular of packages and parcel pieces, preferably with at least one conveyor system. The method comprises a capturing step in which the position and/or orientation of a conveyed item is detected. In a second step, a determination of the orientation and/or the spacing between adjacent conveyed goods is performed by a computer unit. The third step comprises an adjustment of the orientation and/or the spacing between adjacent conveyed goods by at least one cluster module controlled by the control unit and comprising at least one cluster unit. Finally, in the fourth step, a transport element is loaded with at least one conveyed good with optimized orientation. Advantageously, the process also optimizes the spacing between adjacent conveyed goods.

The at least one cluster unit can be rotated around at least one of its axes by means of a drive, which can be realized by a simple structure. It is particularly advantageous if the at least one cluster unit can be rotated about several axes to increase the flexibility of the conveyor system. Furthermore, the rotation speed can be adjusted, for example, depending on the conveyed material.

A cluster unit can communicate or exchange information with further or neighboring cluster units. This can occur without control commands from the control unit. In this way, swarm movements can be realized analogous to a vector field.

An identification means of the conveyed goods and a data element of the transport element can be linked to each other. This makes assignment, processing and separation easier. Thus, for example, the control system knows which conveyed good is in which transport bag.

The following list shows other embodiments and aspects according to the present disclosure.

I. A method for conveying and adjusting the position and/or spacing of conveyed goods, in particular packages and parcel pieces, preferably for an suspension conveyor, in particular a bag suspension conveyor, with at least one conveying device with cluster modules, comprising at least the steps of: capturing a position and/or location of a conveyed good; determining the alignment and/or the spacing between adjacent conveyed goods by a computer unit; adjusting the alignment and/or the spacing between adjacent conveyed goods by at least one cluster module with at least one cluster unit controlled by the control unit; and further processing the aligned conveyed good.

II. A conveyor system as described, wherein a conveyor device includes a plurality of cluster modules configured as a diverter directly downstream of a delivery station of an suspension conveyor.

III. The conveyor system as described in aspect II, wherein the cluster modules as a diverter can determine and/or influence the further conveyance of the conveyed good in different directions.

The solution according to the invention can also be supplemented and further improved by the following further embodiments, each of which is advantageous in itself.

For the person skilled in the art, it is self-evident that all described embodiments can be realized in an embodiment of the present invention according to the invention, provided that they are not explicitly mutually exclusive.

In the following, the present invention will now be explained in more detail with reference to specific examples of embodiments and figures, without, however, being limited to these.

By studying these particular embodiments and figures, further advantageous embodiments of the present invention may become apparent to those skilled in the art.

BRIEF DESCRIPTION OF THE DRAWINGS

With reference to the following figures, examples of embodiments of the invention are described, wherein like reference characters denote like or similar parts.

FIG. 4a shows conveyor devices with conveyed goods pieces in one orientation and objection in a schematic top view;

FIG. 4b shows conveyor devices with conveyed goods pieces in different orientations and objections in a schematic top view;

FIG. 4c shows a conveying device with designated conveyed goods pieces in different orientations and objections in a schematic top view;

FIG. 7a shows a conveyor device with conveyed goods pieces with alignment codes in a schematic top view;

FIG. 7b shows a roller unit with drive in a schematic side view;

FIG. 7c shows a roller unit in a schematic top view;

FIG. 7d shows a schematic side view of an omnidirectional wheel cluster unit;

FIG. 7e shows an omnidirectional wheel cluster unit in a schematic top view;

FIG. 7f shows a driven omnidirectional cluster unit with drive in a schematic side view;

FIG. 8a shows a cluster module with roller cluster units in alignments about different axes in schematic perspective view;

FIG. 8b shows a cluster module with ball cluster units according to the invention in a schematic top view;

FIG. 8c shows a driven and rubberized ball cluster unit with drive in a schematic side view;

FIG. 10a shows a driven, i.e. active and passive, ball cluster unit according to the invention in a schematic side view;

FIG. 10b shows a driven, i.e. active and passive, ball cluster unit according to the invention in a schematic side view;

DETAILED DESCRIPTION OF THE INVENTION

Figure 1A:
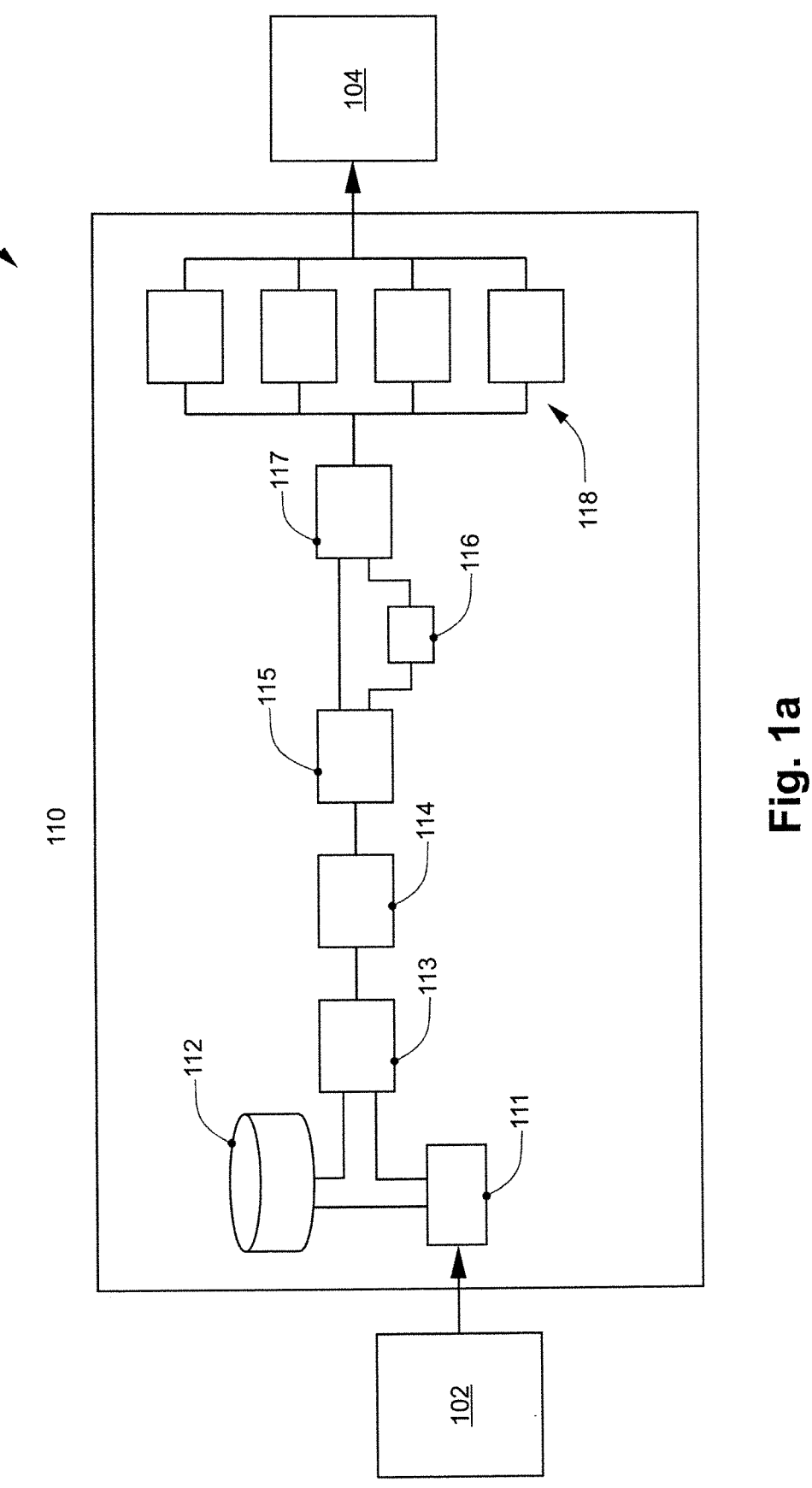
FIG. 1a shows a schematic representation of a logistics chain with processing by a conveyor system, whereby a transfer to conveyor bags takes place.

FIG. 1a shows a schematic diagram of a logistics chain 100 with processing 110 by an overall conveyor system. The logistics chain 100 comprises a forwarding incoming transport 102 and a forwarding outgoing transport 104. The processing 110 of conveyed goods is carried out by the overall conveyor system and specifically by a conveyor system according to the invention. On the input side, a delivery 111 takes place with a simultaneous possible storage 112. Afterwards, a conveying 113 takes place, which is preferably carried out horizontally. This is followed by alignment and identification 114 of the conveyed goods, with the alignment and spacing of the conveyed goods being adjusted. By transfer 115 to a transport element, such as a conveyor bag or a suspension conveyor bag, the conveyed goods are forwarded. These can be temporarily stored in a buffer 116 or directly fed to an order-related sorting 117 before the conveyed goods reach corresponding delivery points or shipping points 118. This is followed by the forwarding outgoing transport 104.

Figure 1B:
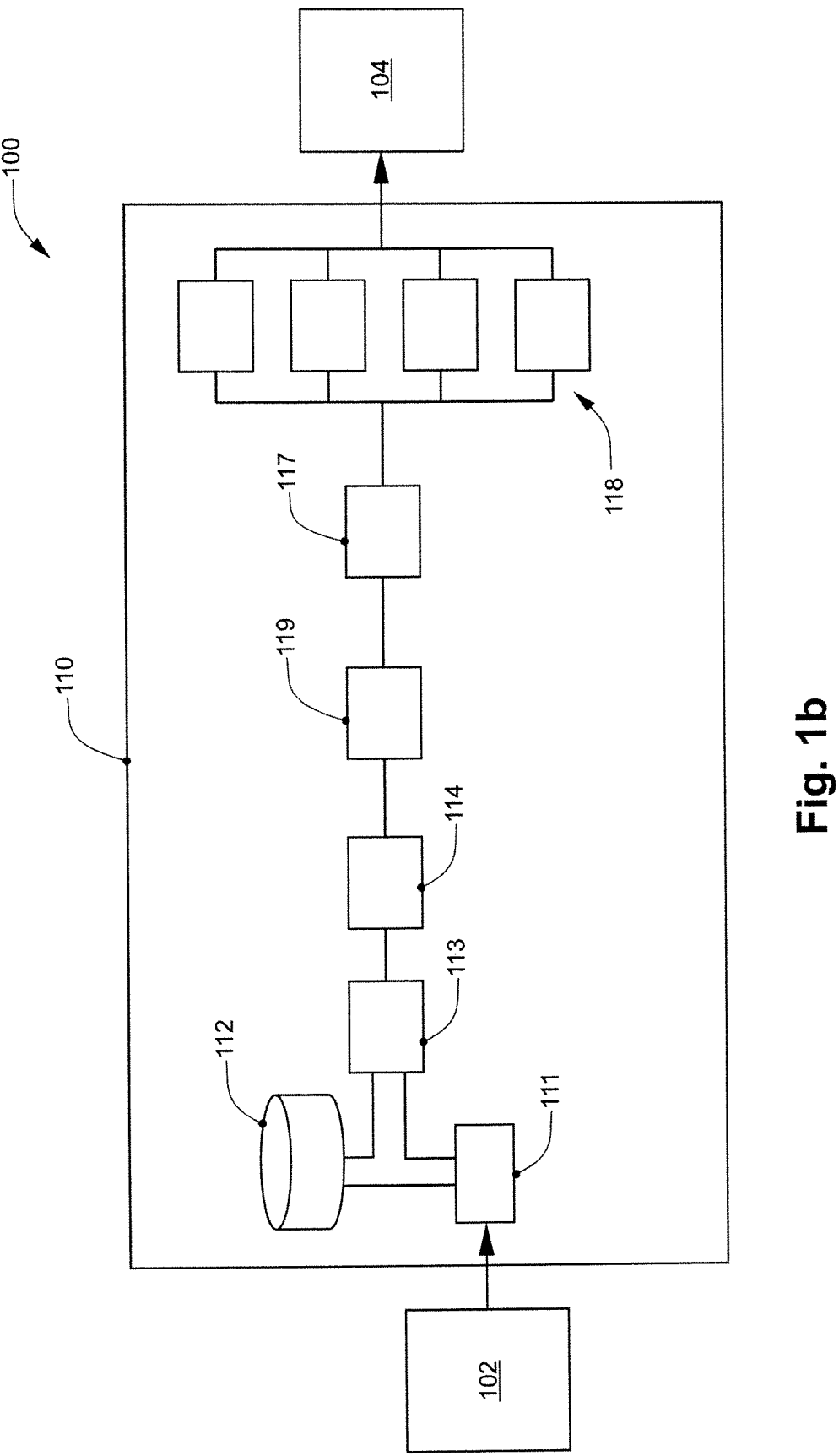
FIG. 1b shows another schematic representation of a logistics chain with processing by a conveyor system, whereby a transfer takes place in tray sorters.

FIG. 1*b* shows another schematic representation of an alternative logistics chain 100 with processing 110 by an overall conveyor system. The logistics chain 100 again comprises a forwarding incoming transport 102 and a forwarding outgoing transport 104. The processing 110 of conveyed goods is carried out by the overall conveyor system and in particular by a conveyor system according to the invention. On the input side, a delivery 111 takes place with a simultaneous possible storage 112. Afterwards, a conveying 113 takes place, which is preferably carried out horizontally. This is followed by alignment and identification 114 of the conveyed goods, with the alignment and spacing of the conveyed goods being adjusted. By transfer 119 to a switching sorter, the conveyed goods are forwarded to an order-related sorting 117 before the conveyed goods reach corresponding delivery points or shipping stations 118. From there, the forwarding outgoing transport 104 takes place.

Figure 2:
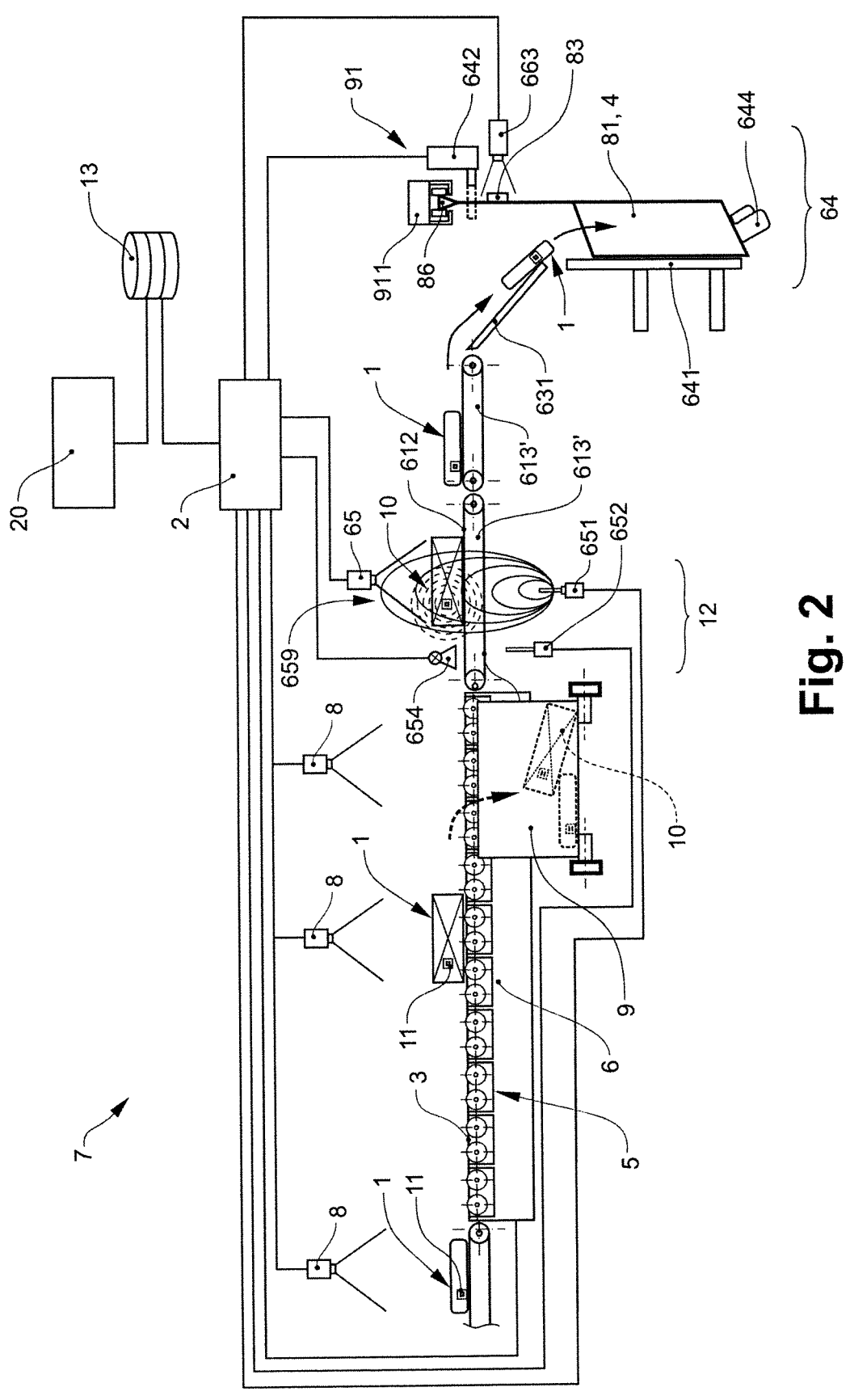
FIG. 2 shows a schematic side view of a conveyor system according to the invention.

FIG. 2 shows a schematic side view of a conveyor system 7 according to the invention for use in a logistics chain 100. Shown are conveyed goods 1 and special parcel pieces 10, which are located on a conveyor device 6, in particular consisting of cluster modules 5 with cluster units 3, and are moved from left to right.

Conveyed goods 1 can be goods, packages, parcel pieces 10, foiled goods, bags, sacks, boxes, letters, as well as all items to be conveyed in the logistics.

Each conveyed good 1 and parcel piece 10 has an identification means 11. One conveyed good 1 and one parcel piece 10 are each located in an accumulation station 9. A plurality of sensor units 8 comprising cameras are installed above the conveyor device 6. An identification device 12 comprising a plurality of components is used to read and determine the identification means 11 before the conveyed goods 1 and parcel pieces 10 are forwarded to transport elements 4, 81 such as conveyor bags 81 via a slope or chute 631.

The sensor units 8 may be designed with cameras, but this is costly. In alternative embodiments, the sensor unit 8 may include an ultrasonic sensor, a light barrier, an RFID reader, a QR code or barcode reader, or the like, instead of or as a supplement.

The conveyed goods 1, 10 are conveyed from the left in conveying direction F onto a belt conveyor 612. In the example shown, the goods are fed via at least two conveyors for flat goods 613'. By selectively stopping, braking and starting these conveyors for flat goods 613', goods 1, 10 can be temporarily parked, whereby a buffer store for goods units can be realized.

A light barrier device 654 transverse to the conveying direction detects a parcel piece 10 arriving on the belt conveyor 612. Taking into account the conveying speed of the belt conveyor 612, the location of the parcel piece 10 on the belt conveyor 612 as well as the longitudinal extension in the conveying direction can thus be determined. This allows correct positioning of the parcel piece 10 at an identification position 659 of a first identification module 65.

The identification device 12 can be designed as a QR code or RFID reader unit. The RFID reader unit has an RF transmitter 651 and an RF receiver 652, both of which are arranged below the feeder module 61. In an alternative embodiment, the identification module 65 detects an identification means 11, which may be implemented as an alignment code.

The various components, subunits and modules of the conveyor device 7 are connected to a control unit 2 and a computer unit 13. The computer unit 13 is connected to a superordinate control system 20. The components, subunits and modules of the conveyor device 7 are controlled by the control unit 2 and transmit data to the control unit 2 and computer unit 13. The control unit 2 receives control commands from the control system 20. The computer unit 13 has a database on which, for example, logical links between transport containers and goods units can be stored. Based on measurements and/or data read-ins from the sensor units 8 and evaluations by the computer unit 13, the cluster modules 5 and cluster units 3 are controlled by the control unit 2 in such a way that the conveyed goods 1 and parcel pieces 10 are aligned in a targeted manner and the distance between adjacent conveyed goods 1, 10 is adjusted in an optimized manner.

The conveyed material 1 then slides over the chute 631 into a suspension conveyor pocket 81 of an suspension conveyor system 91. Swiss patent application CH001030/2022 discloses a device and method for loading suspension conveyor pockets.

In a particular embodiment, the identification means 11 of the conveyed material 1, 10 can be linked to a data element 83 of the transport element 4, 81. The skilled person also understands this as "marrying". A subsequent simple dissolution and separation of the conveyed article 1, 10 from the transport element 4, 81 is thus made possible.

The hanging conveyor bag 81 is transferred from a closed state (not shown) to an open filling state by a staging module 64. While an empty suspension conveyor bag 81, already in the orientation intended for filling, is conveyed while suspended from a track 911, the bottom of the suspension conveyor bag is raised by a sequence of roller-type actuators 642, causing the suspension conveyor pocket to open. The actuators 642 cause the bag to stop and release. A lateral stop 641 stabilizes the suspension conveyor bag horizontally, transverse to the conveying direction of the suspension conveyor system. The suspension conveyor bag is stopped and fixed with respect to the track 911 by means of another stop element. The suspension conveyor bag is now in the filling state. The conveyed goods 1, 10 can be introduced into the suspension conveyor bag 81. After filling, the stop element releases the suspension conveyor bag 81 again. The filled suspension conveyor bag 81 is conveyed further in the suspension conveyor system 91 and the next empty suspension conveyor bag is moved in for filling.

The suspension conveyor bag 81 is brought into the open position by a guide rail 644 arranged along the conveying path of the suspension conveyor system. The transport bag of the suspension conveyor bag 81, which is suspended from a carriage 86, has a readable data element 83 at an upper end, which permits identification of the suspension conveyor bag 81. In the example shown, the data element is designed as an optically readable data element, for example as a barcode or QR code. This transport container data element 83 can be read by an optical reading unit 663. Alternatively, the data element 83 can also be implemented as an RFID element that can be read by an RFID reader unit.

Figure 3A:
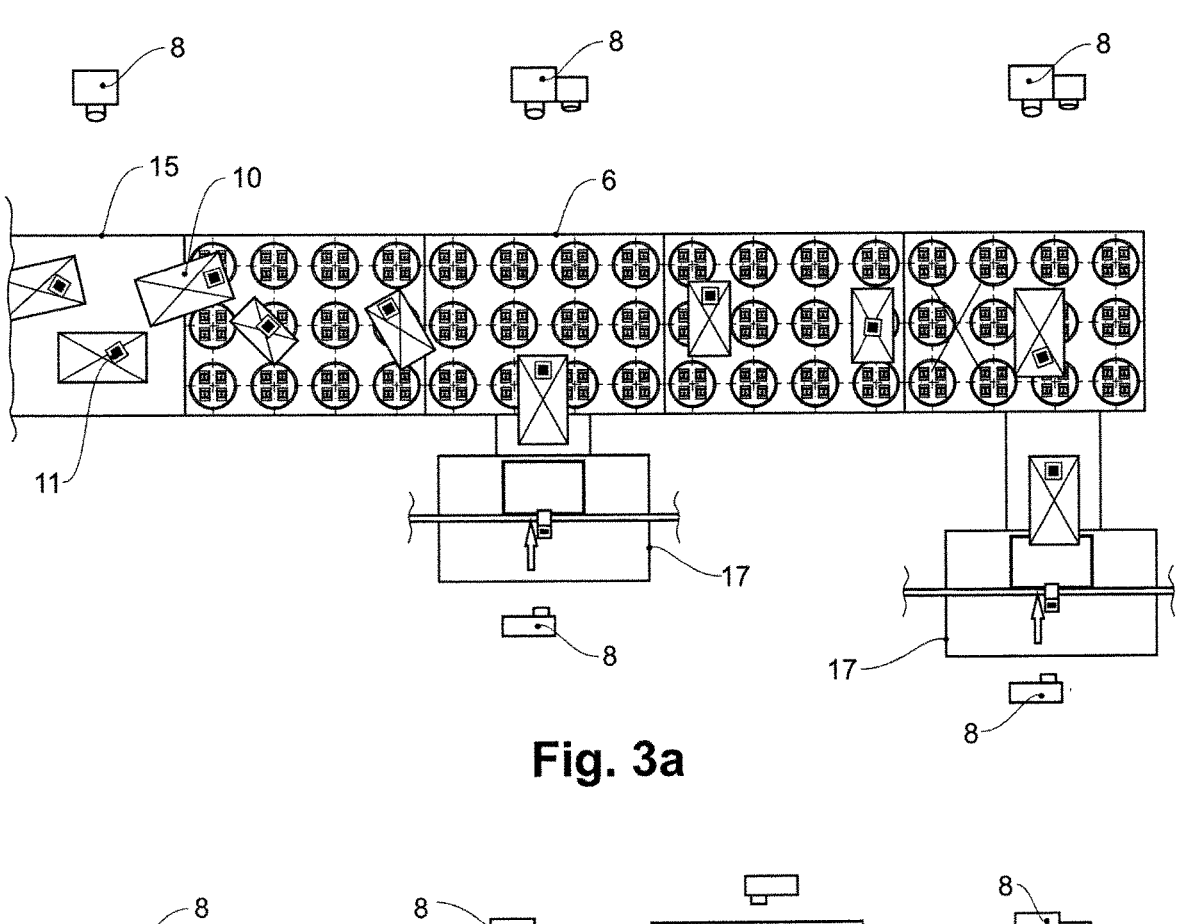
FIG. 3a shows conveyor devices with designated conveyed goods pieces and feed stations in a schematic top view.
Figure 3B:
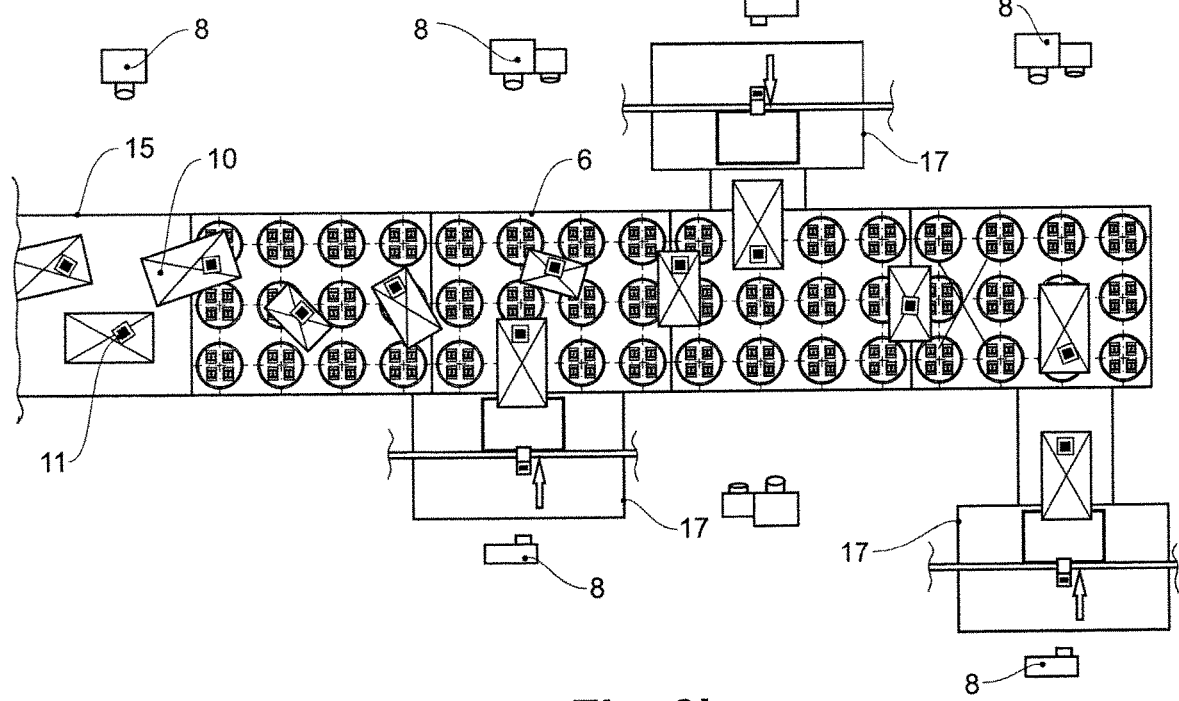
FIG. 3b shows conveyor devices with designated conveyed goods pieces and feed stations in a schematic top view.

FIGS. 3*a-b* show conveying devices with designated conveyed material pieces in a schematic top view.

FIG. 3a shows a conveyor device 6 with parcel pieces 10, a feeder station 15 and two transfer points or transfer stations 17 to a suspension conveyor system, which are arranged on the same side. Sensor units 8 in the form of cameras are arranged above the conveyor device 6. The transfer stations 17 differ in their distance from the conveyor device 6.

FIG. 3b shows a conveyor device 6 also with parcel pieces 10, a feeder station 15 and three transfer stations 17, two of which are located on the same side and a further transfer station 17 is arranged on the other side of the conveyor device 6 for space reasons. Logistics advantages can be achieved by arranging the transfer station 17 accordingly. The onward conveying can be carried out horizontally and/or suspended.

The feeder station 15 can feed conveyed goods 1 or goods lying down (e.g. with a belt conveyor) or hanging with a bag or suspension conveyor.

FIGS. 4a-c illustrate conveying devices with conveyed goods in different orientations and objections in a schematic top view.

FIG. 4a shows a conveyor device 6 with cluster modules 5. Twelve cluster modules 5 form a unit here, with three units arranged one behind the other. Sensor units 8 with cameras are located above the conveyor device 6 as well as a control unit 2 enables the alignment of the conveyed goods 1. The control unit 2 is connected to the control system 20 (not shown). On the left side, above the feeding station 15, a first camera 8.1 detects a conveyed good 1 orthogonal to the conveying direction. In a first unit of the conveyor device 6, the conveyed good 1 is slightly aligned and checked again in the second section by a second camera 8.2 before the conveyed good 1 is aligned in a third section by means of a third unit of the conveyor device 6 parallel and longitudinally to the conveying direction. A third camera 8.3 checks the correct alignment of the conveyed good 1 at a removal point or a transfer table on the right side.

In FIG. 4b, two conveyed goods 1 enter the first unit of the conveyor 6 almost in parallel. These are now to be aligned and brought into a sequence. After detection by the first camera 8.1, the two conveyed goods 1 are brought into a sequence in the first unit of the conveyor device 6, whereby one conveyed good 1 is slightly decelerated or braked and an alignment takes place.

FIG. 4c shows a schematic top view of a conveyor device 6 with designated conveyed goods pieces in different orientations and spacings. The conveyor device 6 has two units of cluster modules 5 with a total of twenty-four cluster modules 5. The first camera 8.1 establishes the position of the conveyed goods 1 so that an alignment can be performed by means of the two units of cluster modules 5 before the conveyed goods 1 is fed to a transfer station 17 to the suspension conveyor system 91. A stop element is arranged at the transfer station 17 at the arrow. The conveyed good 1 is finally fed to an opened bag. The conveyed goods 1 have an identification means 11. The identification means 11 can be designed as a QR code in order to provide for a simple and quick assignment and identification. Alternatively and additionally, an RFID code, barcode, or the like can be provided.

FIGS. 5a-d show a conveyor device 6 with sixteen cluster modules 5 as a single unit. Various functionalities of the conveyor device 6 are shown. Conveyor good pieces 1 are aligned, moved, offset, spaced and rotated by means of the conveyor device 6.

Swiss patent application CH000788/2022, dated Jun. 29, 2022, discloses a conveyor system with a device for steering horizontally conveyed goods.

Figures 5A, 5B, 5C, 5D:
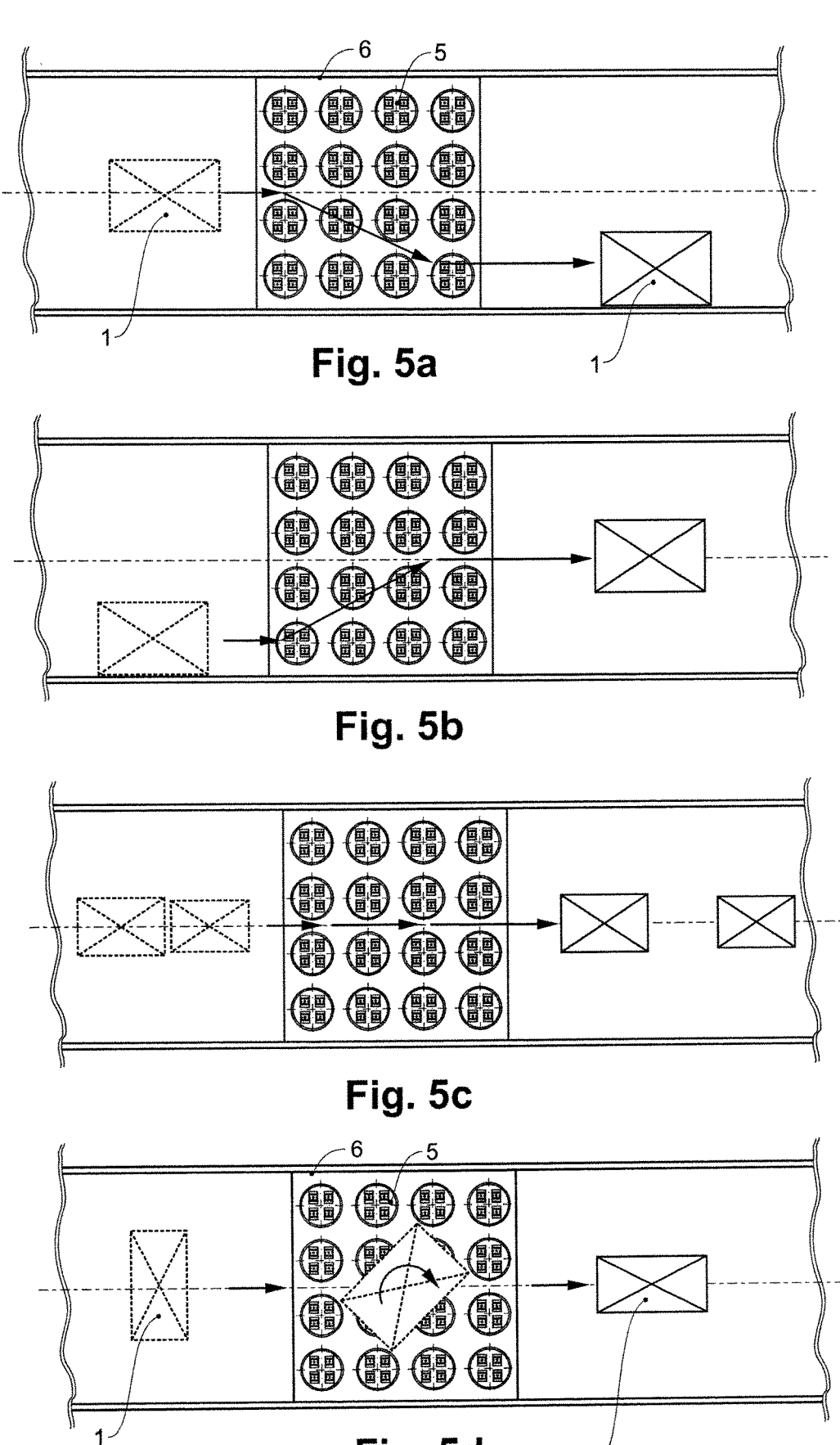
FIG. 5a shows conveyor devices with a cluster module and conveyed goods pieces.
FIG. 5b shows conveyor devices with a cluster module and conveyed goods pieces.
FIG. 5c shows conveyor devices with a cluster module and conveyed goods pieces.
FIG. 5d shows conveyor devices with a cluster module and conveyed goods pieces.

In FIG. 5a, a central conveyed good 1 is moved forward at an angle so that it is moved or displaced laterally.

In FIG. 5b, a lateral conveyed good 1 is moved diagonally forward so that it can be transported further in the center.

In FIG. 5c, two closely spaced conveyed goods 1 are brought to a defined distance apart. This is done by transporting one conveyed good 1 further, while the other conveyed good is decelerated in its forward movement.

FIG. 5c shows how a conveyed good oriented orthogonally to the conveying direction is rotated by approximately 90° by means of cluster modules 5 of the conveying device 6 in order to then be transported further along the conveying direction.

Figures 6A, 6B, 6C:
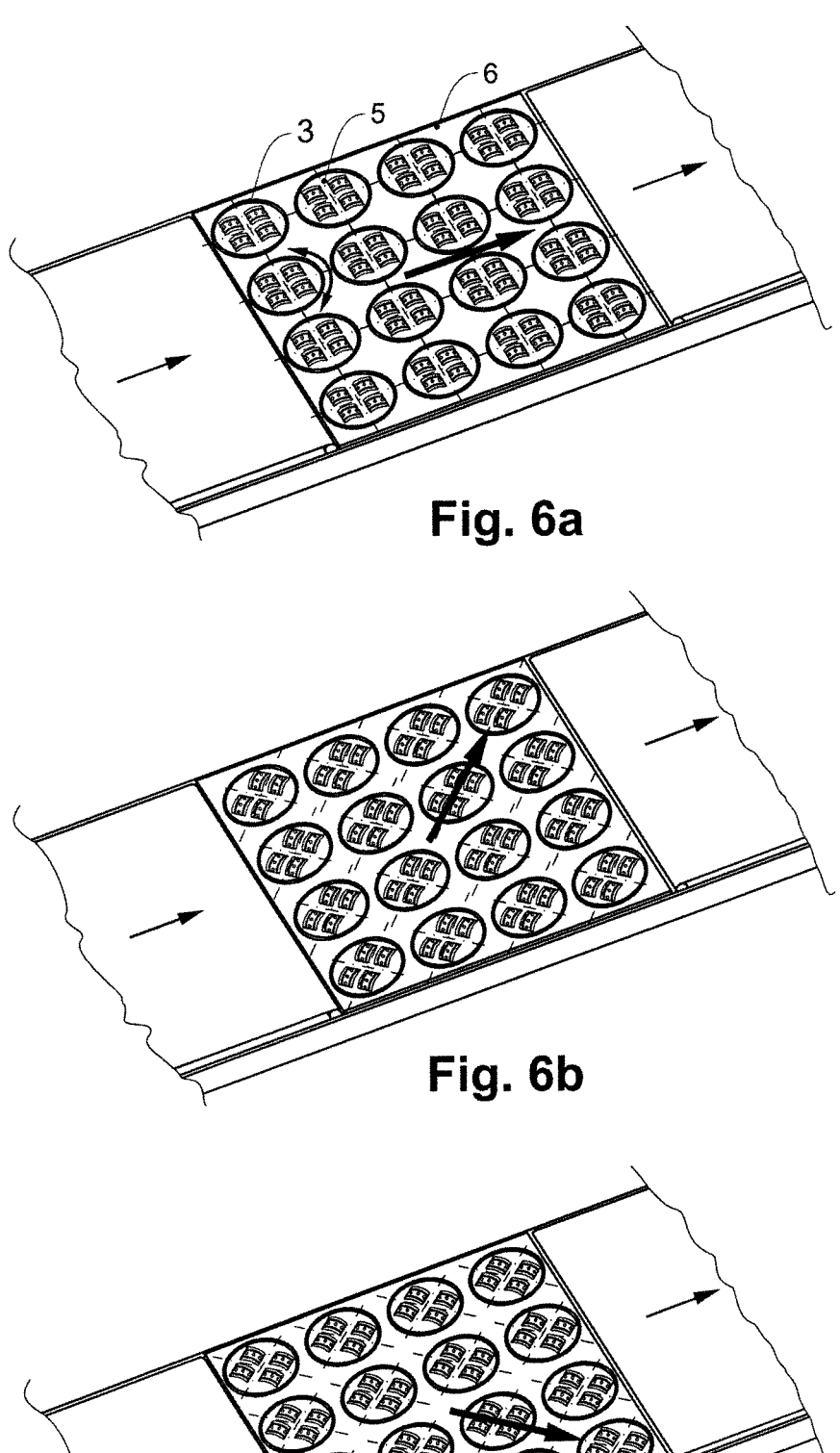
FIG. 6a shows a cluster module in various orientations and in a schematic perspective view.
FIG. 6b shows a cluster module in various orientations and in a schematic perspective view.
FIG. 6c shows a cluster module in various orientations and in a schematic perspective view.

FIGS. 6a-c show a conveyor device 6 with sixteen cluster modules 5 and various drive options or directions. Depending on the task, more or fewer cluster modules 5 can be arranged and driven.

Each cluster module 5 has a plurality of cluster units 3. In addition, each cluster module 5 is rotatable in the plane.

In FIG. 6a, all cluster units 3 of cluster modules 5 are aligned in the conveying direction.

In FIG. 6b, the cluster modules 5 are aligned with the cluster units 3 offset by approximately 45° in one direction.

In FIG. 6c, the cluster modules 5 are aligned with the cluster units 3 offset by approximately 45° in the other direction.

FIG. 7a shows a conveying device 6 with conveyed goods pieces 1 and an identification means 11 as well as an alignment code 16 in a schematic top view. On the conveyor device 6, conveyed items 1 are moved to a print head 19. By means of sensor unit 8 and control unit 2, the conveyed goods pieces 1 are fed to a marking device 14 without identification means 11, alignment label or alignment code 16. A print head 19 of the marking device 14 prints identification means 11 and/or alignment codes 16 on the conveyed goods pieces 1.

These are then moved on and run back on the other side as conveyed goods pieces 1' with identification means 11 and alignment code 16. The sensor units 8 monitor the conveyed goods pieces 1, P. The position and orientation of a piece of conveyed goods pieces 1 can be detected as the orientation of its outer shell and/or the orientation of the alignment code 16 by means of the sensor unit 8 and can be corrected by means of cluster modules 5. The position of a conveyed goods piece 1 can be detected as the position of an outer shell of the conveyed goods piece 1 and/or the position of the alignment code 16 by means of the sensor unit 8.

FIG. 7b shows a roller cluster unit 70 of a roller cluster module 5b in a schematic side view with drive elements. A roller 72 is rubberized or coated on the surface. The coating is preferably adhesive, so that a non-slip and secure transport of the conveyed goods 1 can take place. In a preferred embodiment, the coating is selected to ensure good adhesion as well as grip of the conveyed goods 1. The roller cluster unit 70 is driven by gear wheels 78 or alternatively belt elements. The drive is an electric drive 79, for example a servo motor or stepper motor. The electric drive 79 of the roller cluster module 5b can be in both directions, so that the roller 72 rotates and stops to the left and to the right, which can be important for a braking effect.

FIG. 7c shows the roller cluster unit 70 of FIG. 7b in a schematic top view. The coated roller 72 can rotate about two axes and thus enables the conveyed goods 1 to be advanced or conveyed in all directions of a plane.

FIG. 7d illustrates an omnidirectional wheel cluster unit 75 with a plurality of roller blocks 76 mounted at a specific angle, such as 90° to the main wheel unit 77, so that it can move in any direction, including sideways, without the need for complex steering mechanisms.

FIG. 7e illustrates the all-side wheel cluster unit 75, which can rotate about two axes. In addition, individual roller blocks 76 can rotate about one axis. All of this allows for a high degree of flexibility in the movement and transportation of conveyed goods 1 in the conveyor device 6. Alternatively or additionally, the omnidirectional wheel cluster unit 75 can rotate around at least two axes. This provides greater stability and balance, particularly when carrying heavy conveyed goods 1. The ability to rotate about multiple axes helps to distribute the weight of the conveyed goods 1 more evenly, reducing the risk of tipping or imbalance.

FIG. 7f illustrates the all-side gear cluster unit 75, which is driven by gears 78 or by means of belt element(s). The drive is an electric drive 79, for example it can be a stepper motor. The gears 78 or belt element(s) transmit the power of the electric drive 79 to the all-side wheel cluster unit 75, which comprises a plurality of rotatable roller blocks 76. These roller blocks 76 are arranged to rotate in all directions to provide optimum maneuverability of the omnidirectional wheel cluster unit 75.

In FIG. 8a, a roller cluster module 5b with roller cluster units 70 in various orientations is shown in schematic perspective view. The roller cluster module 5b includes four roller cluster units 70 with rollers 72. Shown is the pivotability or orientation of the roller cluster module 5b by 90° and to each side. The orientation of the roller cluster module 5b can be at any angle, providing flexibility to the conveyor system.

In FIG. 8b, a ball cluster module 5a with ball cluster units 80 according to the invention is shown in a schematic top view. Shown is a ball cluster module 5a with five ball cluster units 80 whereby four convey or rotate in the same direction and one centrally arranged ball cluster unit 80 rotates orthogonally. This can be used for speed reduction. The number of ball cluster units 80 in a ball cluster module 5a can be different and is to be adapted to the conveying tasks.

FIG. 8c shows a driven and rubberized ball cluster unit 80 in a schematic side view. The surface of a ball 82 is rubberized or coated here. The coating is preferably adhesive so that the conveyed goods 1 can be transported with a good grip and securely. The coating is selected in such a way that good adhesion as well as grip of the conveyed goods 1 is ensured. The ball 82 is driven by means of a ball drive 84, which can be designed to swivel.

Figure 9A:
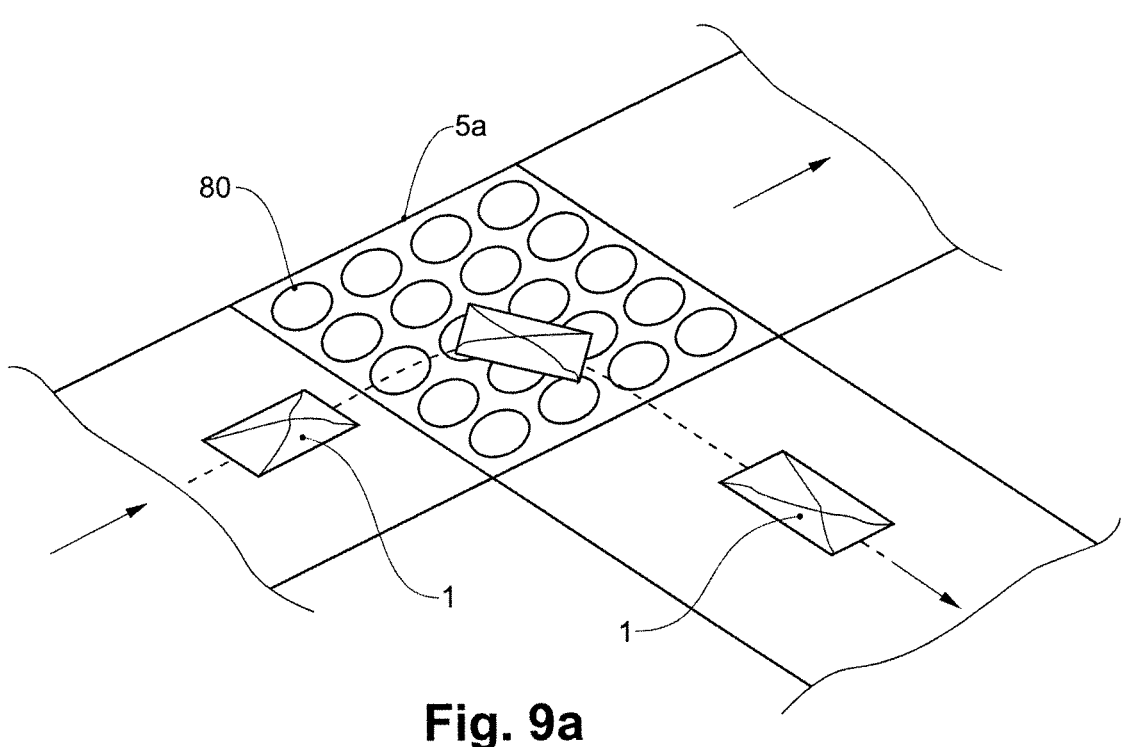
FIG. 9a shows a cluster module with ball cluster units according to the invention in a schematic top view, in one direction and orientation of conveyed goods.
Figure 9B:
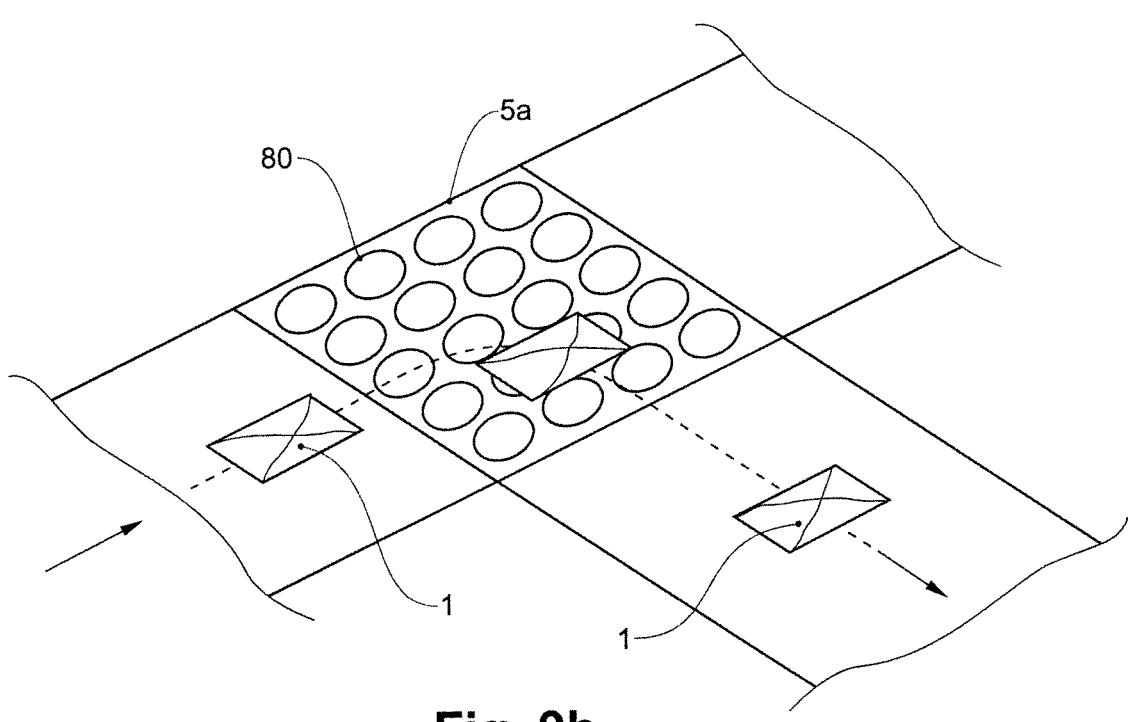
FIG. 9b shows a cluster module with ball cluster units according to the invention in a schematic top view, in another direction and orientation of conveyed goods.

FIG. 9a-b show a ball cluster module 5a with ball cluster units 80 according to the invention in a schematic top view, whereby the direction and orientation of conveyed material 1 is changed. The ball cluster module 5a can serve, for example, a discharge of conveyed goods 1.

In FIG. 9a, a conveyed good 1 is rotated or swiveled approximately 90° on the ball cluster module 5a and then conveyed further in the longitudinal direction.

In FIG. 9b, a conveyed good 1 is conveyed further by approx. 90° in the transverse direction by means of ball cluster module 5a.

FIGS. 10a-b show a driven active and passive ball cluster unit 80 according to the invention in a schematic side view. During driving, a drive disk 90 is pressed against the ball 82 and drives the conveyed goods 1.

FIG. 10a shows the freewheeling of the ball 82, with the drive pulley 90 not contacting the ball 82.

FIG. 10b shows the ball cluster unit 80 with the ball 82 driven, and the ball 82 is in contact with the rotating drive disk 90. When the ball is not driven, the drive disk 90 drops and the ball 82 is in freewheeling mode. The surface of the ball 82 is preferably matched to the surface of the drive disk 90, so that a grippy drive is provided.

Figure 10C:
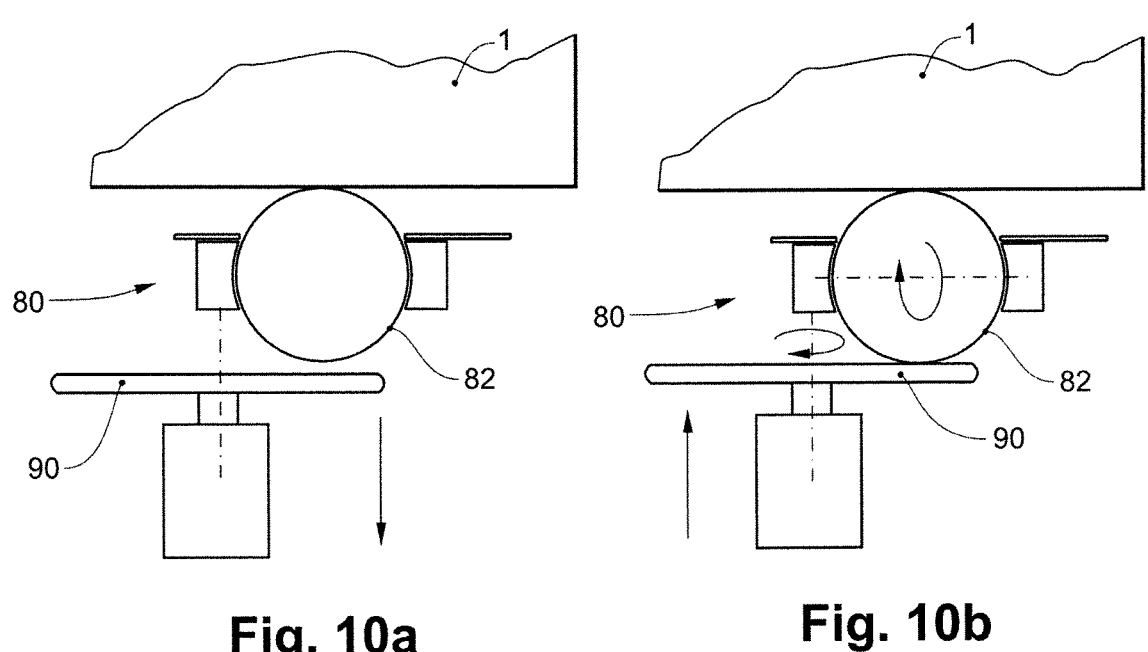
FIG. 10c shows a cluster module consisting of ball cluster units according to the invention in a schematic top view.
Figure 10C:
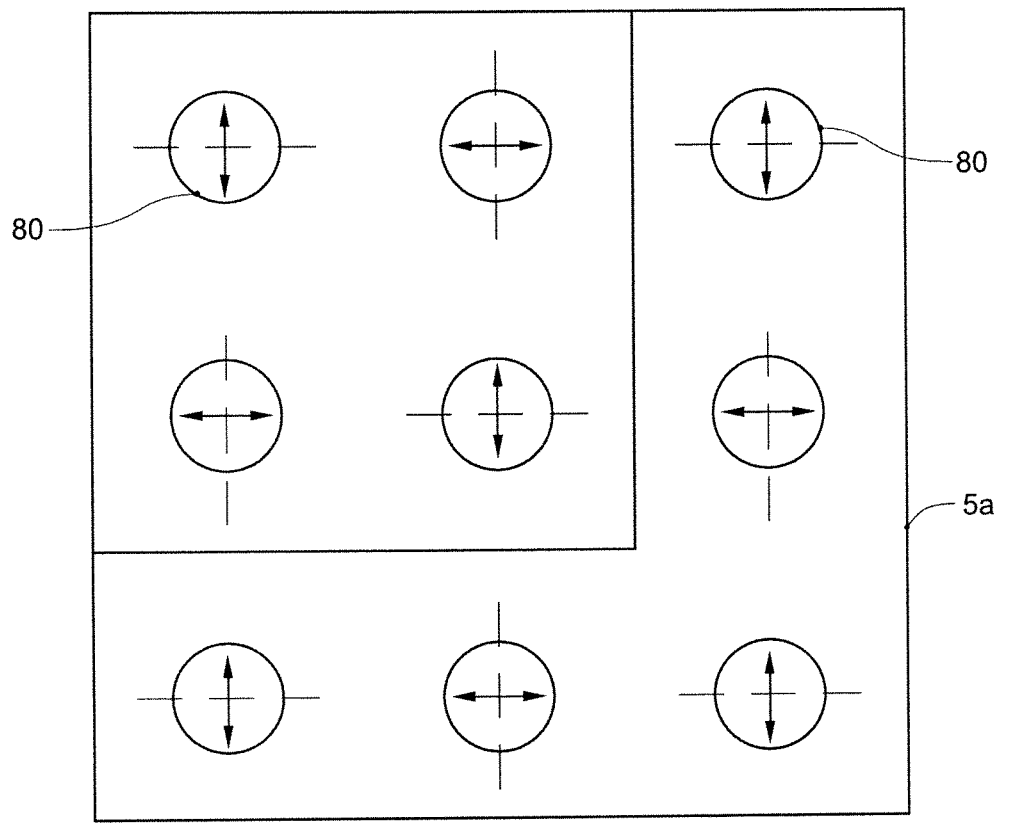

In FIG. 10c, a ball cluster module 5a consisting of ball cluster units 80 according to the invention is shown in a schematic top view. Four ball cluster units 80 or nine ball cluster units 80 form a drive unit. Each ball cluster unit 80 is individually controllable by the control unit 2. The ball cluster units 80 can also be linked to each other in such a way that no control commands from the control unit 2 are necessary. One contact sensor can be arranged per ball cluster unit 80. This can be designed, for example, as a weight sensor, ultrasonic sensor or detection sensor.

As soon as a sensor of a ball cluster unit 80 detects a conveyed material 1, the information can be passed on to the next or adjacent ball cluster unit 80, all this without a control unit 2. Thus, a kind of wave motion similar to a La-Ola wave can be performed. The cluster modules 5, 5a, 5b and associated cluster units can be made almost passive.

This would be advantageous for energy efficiency. Thus, a cluster unit would only drive or cause a short spin when a conveyed good 1 is detected or noticed by a neighboring cluster unit or its sensor. For example, the information can be passed as information wave to every second, third, etc. Cluster unit to create certain patterns or vector fields.

Figure 11A:
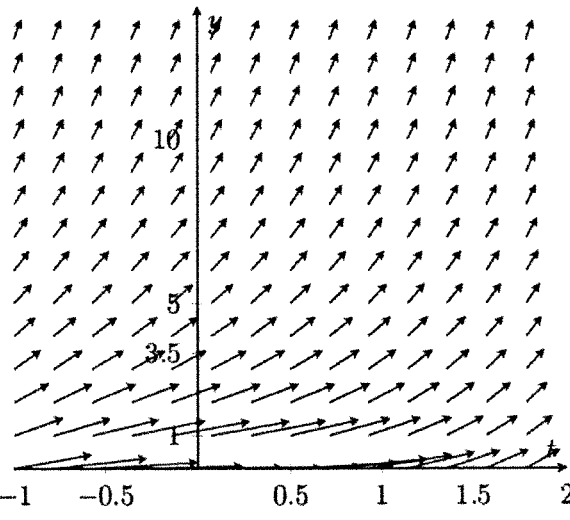
FIG. 11a shows a vector field with flow directions to illustrate the control of cluster modules.
Figure 11B:
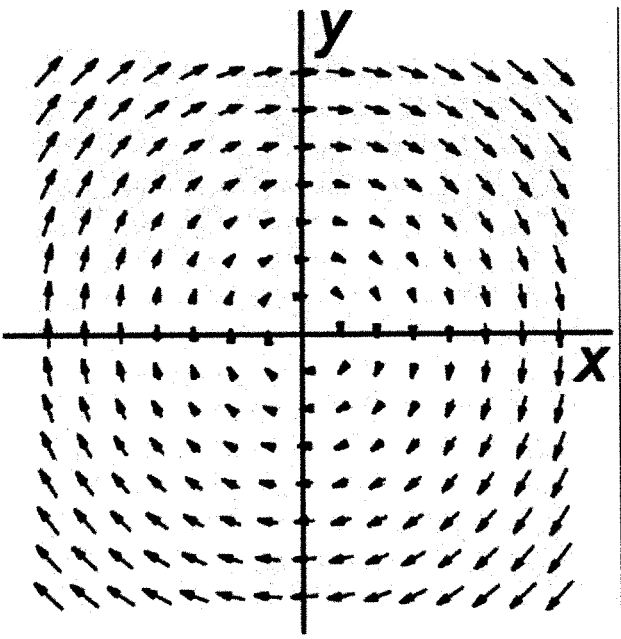
FIG. 11b shows a vector field with different flow directions from FIG. 11a to illustrate the control of cluster modules.

FIGS. 11a-b show a vector field with different flow directions to illustrate the control of cluster modules 5, 5a, 5b and cluster units 3, 70, 80.

FIG. 11a shows a change of direction whereas FIG. 11b shows a rotation.

A vector field is called a gradient field if there is a differentiable function. A two-dimensional vector field g can be described as follows:

$$g(x,y)=2(x,-y) \text{ for all } (x,y) \in \mathbb{R}^2$$

This vector field is the gradient field of the function f: $\mathbb{R}^2$ $\mathbb{R}\mathbb{R}$ with $$f(x,y)=x^2-y^2 \text{ for all } (x,y) \in \mathbb{R}^2.$$

Described differently, the vector field is a mathematical representation of a physical field that has magnitude and direction at every point in space. In this case, a vector field is used to model the motion of the conveyed goods 1 in order to optimize the control of the cluster modules 5, 5a, 5b, and the cluster units 3, 70, 75, 80.

By using artificial intelligence (AI) technologies, such as machine learning and neural networks, the vector field can be optimized in such a way to improve the direction of the material flow. An AI system can learn how best to move cluster modules 5, 5a, 5b, 5c and cluster units 3, 70, 75, 80 to ensure optimal flow. These can take into account various process parameters, such as the weight, speed, location, and orientation and, in addition, the spacing of the conveyed good 1 from other conveyed goods 1 can also be taken into account to increase flow and capacity. Finally, the type of cluster modules 5, 5a, 5b, 5c and cluster units 3, 70, 75, 80 should also be taken into account, e.g. whether a spherical geometry or an omnidirectional geometry was used.

To optimize the vector field, the AI system should be trained with process data that takes into account different process parameters and conditions. This will make the system more robust and reliable to use in different scenarios. After that, the AI system may be able to recognize different patterns and trends and make predictions about how best to adjust the flow directions of the conveyed goods 1. For process data collection, various sensors can be used such as cameras, ultrasonic sensors, or laser scanners to collect important information about the position, movement, and orientation of the conveyed goods 1.

The AI system can be used both offline and online. This means that it can be used not only for offline optimization of the flow directions of the conveyed goods 1, but also for real-time process changes. By continuously optimizing the vector field in real time, the AI system can respond to changes in the number, position, and other process parameters of the conveyed goods 1 and adjust the movement of cluster modules 5, 5a, 5b,5c and cluster units 3, 70, 75, 80 to maintain optimal conveyed goods flow and increase the capacity of the flow.

It is advantageous not to transmit the amount of process data directly to the control system 20 in order not to overload the data traffic or to keep it low. Therefore, processing by one or more local computer units 13 is preferred.

Figure 12:
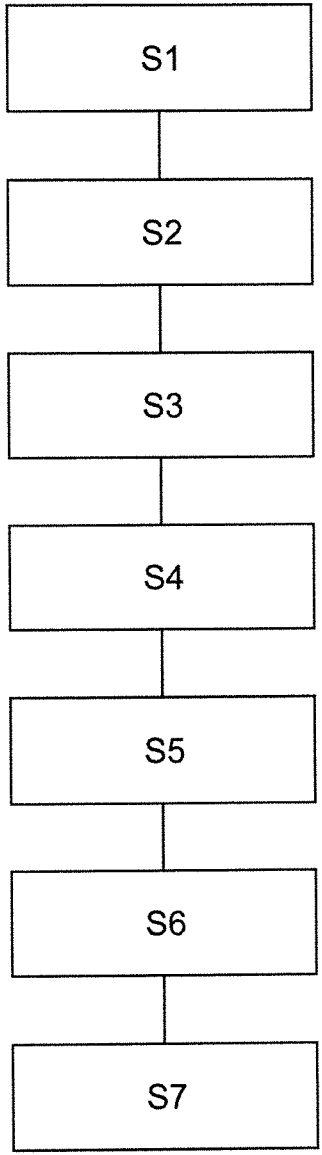
FIG. 12 shows a schematic representation of a method for conveying and adjusting the orientation as well as spacing of conveyed goods.

FIG. 12 shows a schematic representation of a method for conveying and adjusting the position and spacing of conveyed goods 1. In a first step S1, a capturing of the position of a conveyed good 1 takes place. Alternatively or additionally, the position of the conveyed good 1 is captured in a second step S2. Steps S1 and S2 can be carried out simultaneously or almost simultaneously. In a third step S3, a determination of the orientation of the conveyed good 1 is performed by a computer unit 13. Alternatively or additionally, in a fourth step S4, a spacing between adjacent conveyed goods 1 is determined or calculated by a computer unit 13. Steps S3 and S4 can also be carried out simultaneously or almost simultaneously. In a step S5, an adjustment of the orientation of the conveyed goods 1 is performed by a cluster module 5, 5a, 5b with a cluster unit 3, 70, 80 controlled by a control unit 2. Alternatively or additionally, in a sixth step S6, the spacing between adjacent conveyed goods 1 is adjusted by a cluster module 5, 5a, 5b controlled by the control unit 2. This is done by means of cluster units 3, 70, 80, which are rotated about at least one of their axes by means of a drive. Steps S5 and S6 can also be carried out simultaneously or almost simultaneously. In a seventh step S7, the loading of a transport element 4, e.g. an suspension conveyor bag 81, with the conveyed good 1 or several conveyed goods 1 takes place.

Figure 13:
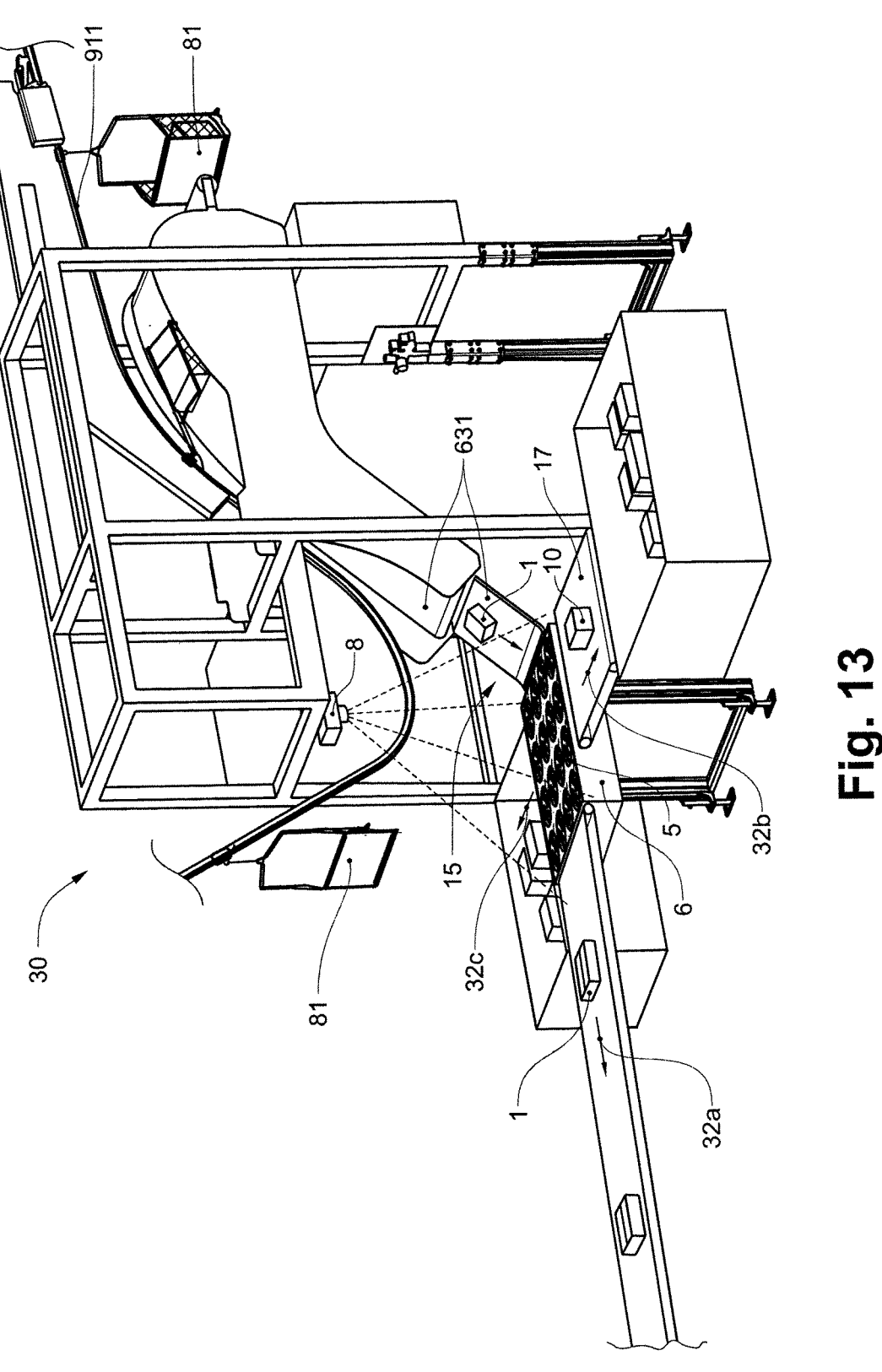
FIG. 13 shows a representation of a delivery station of a suspension conveyor, in particular a bag suspension conveyor, comprising the conveyor system with cluster modules and different conveyed good pieces.

FIG. 13 shows a representation of a delivery station 30 of a suspension conveyor, in particular a bag suspension conveyor, comprising a conveyor device 6 with cluster modules 5 and conveyed good 1, 10. The cluster modules 5, also called alignment modules, of the conveyor device 6 are placed directly behind a slope or chute 631 of the delivery station. The chute 631 leads to the cluster modules 5 above which a camera 8 is arranged for position detection. The conveyed good 1 and parcel pieces 10, i.e. articles such as unit loads, receive a rotational impulse after being discharged from a bag 81 on the chute 631, which results in the discharged articles being given an arbitrary orientation. The angular momentum can be influenced by the inclination and/or side boundaries of the chute 631.

The subsequent conveying device 6 with the cluster modules 5 can again give the conveyed good 1 a "new" orientation, whereby this "new" orientation helps to carry out a subsequent further processing.

Alternatively or additionally, the alignment or correction of the conveyed good 1 and/or or parcel pieces 10 can also take place later during further processing.

Furthermore, the conveyor device 6 can be used with the cluster modules 5, to distribute the incoming goods 1, 10 to different conveying paths 32a, 32b, 32c, i.e. a thus a function like a diverter or switch. The conveyed goods 1 can, as shown, be conveyed straight ahead 32a, to the left 32b or to the right 32c. A precise alignment can also be achieved by means of the cluster modules 5.

The advantage of the fast delivery station can be combined with the fast cluster modules 5 as diverters. In this way, the conveyed goods 1 and packages 10 can be distributed quickly and precisely for further processing, such as commissioning or packing.

The present invention discloses a conveyor system for conveying and adjusting the position and spacing of conveyed goods. It goes without saying that numerous further embodiments are conceivable for a person skilled in the art on the basis of the exemplary embodiments described.

The invention claimed is:

1. A conveyor system for conveyed goods including packages and/or parcel pieces, the conveyor system comprising:
   at least one conveyor device comprising at least one cluster module that comprises at least one cluster unit to adjust the position of a conveyed good relative to other conveyed goods;
   a transport element configured to convey conveyed goods, wherein the transport element is a conveyor bag in which goods are loadable;
   at least one transfer station arranged on the at least one conveyor device, wherein the at least one transfer station is configured to transfer the conveyed goods;
   at least one control unit connected to the conveyor device, wherein the cluster unit is individually controllable in dependence on adjacent cluster units and/or receives control commands by means of the control unit on the basis of measurements and/or data read-in in order to adjust the position of a conveyed good and/or spacing between adjacent conveyed goods; and
   a superordinate control system which is connected to the at least one control unit in terms of control technology, so that an adjustment of the position of a conveyed good and/or spacing between adjacent conveyed goods occurs on the basis of control commands of the control system.

2. The conveyor system according to claim 1, wherein the at least one control unit is coupleable to at least one computer unit, wherein the at least one computer unit receives control commands from the control system.

3. The conveyor system according to claim 2, wherein the at least one computer unit is designed to determine the position of a conveyed good and/or spacing between adjacent conveyed goods in an optimized manner on the basis of the dimensions and/or a content of a transport element.

4. The conveyor system according to claim 1, wherein the adjustment of the position and/or spacing of the conveyed goods occurs through the at least one control unit.

5. The conveyor system according to claim 1, wherein the adjustment of the position and/or spacing of the conveyed goods occurs without control commands from the control unit.

6. The conveyor system according to claim 1, wherein the control unit controls independently of the control system.

7. The conveyor system according to claim 1, wherein the at least one conveyor device comprises multiple cluster modules.

8. The conveyor system according to claim 1, wherein the cluster unit comprises a ball which is configured to be drivable or driveless.

9. The conveyor system according to claim 1, wherein the cluster unit comprises a roller or an omnidirectional wheel, which is designed to be drivable or driveless.

10. The conveyor system according to claim 1, wherein the cluster unit has a surface coating which is rubberized.

11. The conveyor system according to claim 1, wherein the at least one cluster module comprises a plurality of cluster units and each of said cluster units is individually controllable by the at least one control unit.

12. The conveyor system according to claim 1, wherein each of the cluster modules is configured as a ball cluster module or a roller cluster module or omnidirectional wheel cluster module.

13. The conveyor system according to claim 1, wherein at least one feed station and the at least one transfer station are arranged on the at least one conveyor device.

14. The conveyor system according to claim 1, wherein at least one accumulation station is arranged on the at least one conveyor device.

15. The conveyor system according to claim 1, wherein the conveyor system comprises a marking device.

16. The conveyor system according to claim 15, wherein the marking device designates at least one conveyed good with an identification means and/or an alignment code.

17. The conveyor system according to claim 15, wherein the identification means is the alignment code.

18. The conveyor system according to claim 15, wherein an orientation of the conveyed good is detectable as the orientation of an outer shell of the conveyed good and/or orientation of the alignment code.

19. The conveyor system according to claim 15, wherein a position of the conveyed good is detectable as the position of an outer shell of the conveyed good and/or position of the alignment code.

20. The conveyor system according to claim 1, wherein the conveyor system comprises at least one sensor unit designed to detect the position and/or location of at least one conveyed good.

21. A method for conveying and adjusting the position and/or spacing of conveyed goods including packages and parcel pieces, with at least one conveyor system according to claim 1, comprising the method steps:

capturing a position and/or location of a conveyed good;

determining the alignment and/or spacing between adjacent conveyed goods by a computer unit;

adjusting the alignment and/or the spacing between adjacent conveyed goods by at least one cluster module controlled by the control unit and comprising at least one cluster unit; and loading of a transport element with the conveyed good.

22. The method of claim 21, wherein the at least one cluster unit is rotated about at least one of its axes by means of a drive.

23. The method according to claim 21, wherein the at least one cluster unit communicates with further cluster units.

24. A method according to claim 21, wherein an identification means of the conveyed good and a data element of the transport element are linked.

25. The conveyor system according to claim 1, wherein the transport element comprises a suspension conveyor bag.

* * * * *